United States Patent
Lewis et al.

(10) Patent No.: US 8,222,921 B2
(45) Date of Patent: *Jul. 17, 2012

(54) CONFIGURABLE TIME BORROWING FLIP-FLOPS

(75) Inventors: David Lewis, Toronto (CA); David Cashman, Toronto (CA)

(73) Assignee: Altera Corporation, San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/987,977

(22) Filed: Jan. 10, 2011

(65) Prior Publication Data

US 2011/0102017 A1    May 5, 2011

Related U.S. Application Data

(63) Continuation of application No. 12/505,451, filed on Jul. 17, 2009, now Pat. No. 7,868,655, which is a continuation of application No. 11/731,125, filed on Mar. 30, 2007, now Pat. No. 7,583,103.

(51) Int. Cl.
*H03K 19/173* (2006.01)
*H03K 19/094* (2006.01)
*H03B 19/00* (2006.01)
*H03L 7/00* (2006.01)

(52) U.S. Cl. ............. 326/38; 326/86; 327/117; 327/154

(58) Field of Classification Search .................... 326/63, 326/68, 82, 83, 86, 87; 327/140
See application file for complete search history.

(56) References Cited

U.S. PATENT DOCUMENTS

| | | | |
|---|---|---|---|
| 5,550,782 A | 8/1996 | Cliff et al. | |
| 5,557,225 A | 9/1996 | Denham et al. | |
| 5,748,018 A * | 5/1998 | Ishikawa | 327/154 |
| 6,201,415 B1 | 3/2001 | Manglor | |
| 6,608,513 B2 | 8/2003 | Tschanz et al. | |

(Continued)

FOREIGN PATENT DOCUMENTS

CN    1175327    3/1998

OTHER PUBLICATIONS

Boyle et al., U.S. Appl. No. 11/715,593, filed Mar. 7, 2007.

(Continued)

*Primary Examiner* — Shawki S Ismail
*Assistant Examiner* — Dylan White
(74) *Attorney, Agent, or Firm* — Treyz Law Group; G. Victor Treyz; David C. Kellogg

(57) ABSTRACT

Configurable time-borrowing flip-flops are provided for circuits such as programmable logic devices. The flip-flops may be based on a configurable delay circuit and two latches or may be based on a configurable pulse generation circuit and a single latch. In designs based on two latches, a first and a second latch are arranged in series. A clock signal is delayed using a configurable delay circuit. Programmable memory elements that have been loaded with configuration data may be used to adjust how much delay is produced by the configurable delay circuit. The delayed version of the clock signal is provided to a clock input associated with the first latch. The second latch has a clock input that receives the clock signal without delay. In designs based on a single latch, a configurable pulse generation circuit receives a clock signal for the flip-flop and generates a corresponding clock pulse for the latch.

23 Claims, 21 Drawing Sheets

U.S. PATENT DOCUMENTS

| | | | |
|---|---|---|---|
| 6,748,565 B1 * | 6/2004 | Holmes et al. | 714/731 |
| 6,806,739 B2 | 10/2004 | Markovic et al. | |
| 6,873,187 B1 * | 3/2005 | Andrews et al. | 326/93 |
| 6,930,522 B2 * | 8/2005 | Chang | 327/154 |
| 7,002,390 B2 | 2/2006 | Florescu | |
| 7,088,136 B1 | 8/2006 | Lewis | |
| 7,107,477 B1 | 9/2006 | Singh et al. | |
| 7,583,103 B2 * | 9/2009 | Lewis et al. | 326/38 |
| 7,868,655 B2 * | 1/2011 | Lewis et al. | 326/38 |
| 2003/0001613 A1 | 1/2003 | Nakaya | |
| 2004/0135610 A1 | 7/2004 | Chang | |
| 2005/0005214 A1 * | 1/2005 | Ueda | 714/726 |
| 2005/0134348 A1 | 6/2005 | Florescu | |
| 2009/0108895 A1 * | 4/2009 | Saint-Laurent et al. | 327/176 |

OTHER PUBLICATIONS

V. Stojanovic et al. "Comparative Anaysis of Master-Slave Latches and Flip-Flops for High-Performance and Low-Power Systems," IEEE J. Solid State Circuits, vol. 34, No. 4, Apr. 1999, pp. 536-548.

N. Nedovic et al. "A Clock Skew Absorbing Flip-Flop," 2003 IEEE Intternational Solid State Circuits Conference, paper 19.5 (10 pages).

V.G. Oklobdzija, "Clocking and clocked storage elements in a multi-gigahertz environment", IBM J. Res. & Dev. vol. 47 No. 5/6/ Sep./Nov. 2003, pp. 567-583.

* cited by examiner

CONFIGURABLE TIME BORROWING FLIP-FLOPS

This application is a continuation of patent application Ser. No. 12/505,451, filed Jul. 17, 2009, now U.S. Pat. No. 7,868,655 which is a continuation of patent application Ser. No. 11/731,125, filed Mar. 30, 2007, now U.S. Pat. No. 7,583,103, which are hereby incorporated by reference herein in their entireties. This application claims the benefit of and claims priority to patent application Ser. No. 12/505,451, filed Jul. 17, 2009 and patent application Ser. No. 11/731,125, filed Mar. 30, 2007, now U.S. Pat. No. 7,583,103.

BACKGROUND

This invention relates to flip-flops in integrated circuits such as programmable logic device integrated circuits, and more particularly, to configurable time borrowing flip-flops that help logic designers improve circuit performance.

Integrated circuits typically contain combinational logic and sequential logic. Combinational logic does not include storage elements. The output of a given combinational logic circuit is therefore determined solely by its present inputs. Sequential logic circuits contain storage elements with outputs that reflect the past sequence of their input values. As a result, the output of a sequential circuit is determined by both its present inputs and by the data stored in its storage elements.

Commonly-used sequential circuit storage elements include level-sensitive latches and flip-flops.

In a level-sensitive latch, the latch output is controlled by the level of a clock (enable) input. When the clock is high, the latch output tracks the value of the input. When the clock transitions from high to low, the output state of the latch is frozen at whatever value was present just prior to the transition. So long as the clock is low, the output of the latch will be maintained in its frozen state.

Flip-flops are edge-triggered devices that change state on the rising or falling edge of an enable signal such as a clock. In a rising-edge-triggered flip-flop, the flip-flop samples its input state only at the rising edge of the clock. This sampled value is then maintained until the next rising edge of the clock.

Flip-flop-based logic circuits are often preferred over latch-based circuits, because the regularity imposed by the edge-triggered properties of flip-flops makes circuit timing behavior relatively straightforward to model and hence simplifies design.

However, in a conventional flip-flop-based logic circuit, the clock frequency must generally be slowed down sufficiently to accommodate the delay associated with the circuit's slowest combinational logic paths. Even if circuitry in a fast logic path produces a valid signal in less time than a slow logic path, that signal is not used until the edge of the next clock pulse. While the regularity imposed by conventional flip-flop circuits is beneficial for ease of circuit design, it tends to limit performance in certain situations.

Time borrowing schemes have been developed to try to address this problem. For example, time borrowing schemes have been developed in which various delays are provided in the clocks feeding the edge triggered flip-flops on a circuit. By selecting appropriate delays for the clocks, a circuit designer can configure a logic circuit so that flip-flops in slower paths have their clock edges delayed. This allows time to be borrowed from fast logic paths and provided to slow logic paths, so that the clock speed for the entire circuit need not be slowed to accommodate worst-case delays.

With these conventional time borrowing schemes, it can be difficult to obtain optimal performance due to the limited number of delays that are available from the clock network. Other such schemes for improving timing performance may have limited applicability or require unacceptably complex analysis. For example, time borrowing flip flops have been developed that provide a fixed and relatively small amount of time borrowing. These schemes cannot provide optimal performance in many circuits.

It would be desirable to be able to provide improved time borrowing flip-flop circuits to optimize circuit performance on integrated circuits such as programmable logic devices.

SUMMARY

In accordance with the present invention, configurable time-borrowing flip-flops are provided for integrated circuits such as programmable logic device integrated circuits. The flip-flops may be based on a configurable delay circuit and two latches or may be based on a configurable pulse generation circuit and a single latch.

In designs based on two latches, a first and a second latch are arranged in series. A clock signal is delayed using a configurable delay circuit. The delay circuit may have a delay element that receives the clock signal. The delay element may produce multiple delayed versions of the clock signal, each having a respective different amount of associated delay. The delayed versions of the clock signal may be provided to the inputs of a multiplexer. The multiplexer may have an inverting output connected to a clock input associated with the first latch.

Programmable memory elements that have been loaded with configuration data may be used to adjust the state of a multiplexer. By adjusting the multiplexer, the amount of delay that is imposed on the clock signal for the first latch can be controlled. The second latch has a clock input that receives the clock signal without passing through the delay circuit.

In designs based on a single latch, a configurable pulse generation circuit may receive a clock signal for the flip-flop and may generate a corresponding clock pulse for the latch. The configurable pulse generation circuit may include a logic gate such as an AND gate that has first and second inputs and an output. The output of the logic gate may be connected to the input of a latch.

The flip-flop clock signal may be provided in parallel to a configurable delay circuit and to the first input of the logic gate. The configurable delay circuit may contain programmable elements that have been loaded with configuration data and that produce corresponding static control signals. The configurable delay circuit may also include a delay element that produces different amounts of delay for the clock signal. A multiplexer that is controlled by the static control signals may be used to select a given amount of delay for the clock signal from the delay element. The delayed clock signal may be provided in inverted form to the second input of the logic gate. A configurable width pulse is produced at the output of the logic gate and is applied to the clock input of the latch.

Further features of the invention, its nature and various advantages will be more apparent from the accompanying drawings and the following detailed description of the preferred embodiments.

DETAILED DESCRIPTION

The present invention relates to improving circuit performance in synchronous logic circuits using time borrowing techniques. The logic circuits may be part of any suitable integrated circuits. With one particularly suitable arrangement, the logic circuits and time borrowing circuitry of the present invention is implemented on programmable logic device integrated circuits. If desired, the logic circuits and time borrowing circuitry may be implemented on programmable integrated circuits that are not traditionally referred to as programmable logic devices such as microprocessors containing programmable logic, digital signal processors containing programmable logic, custom integrated circuits containing regions of programmable logic, or other programmable integrated circuits that contain programmable logic. The present invention will generally be described in the context of programmable logic device integrated circuits as an example.

Figure 1:
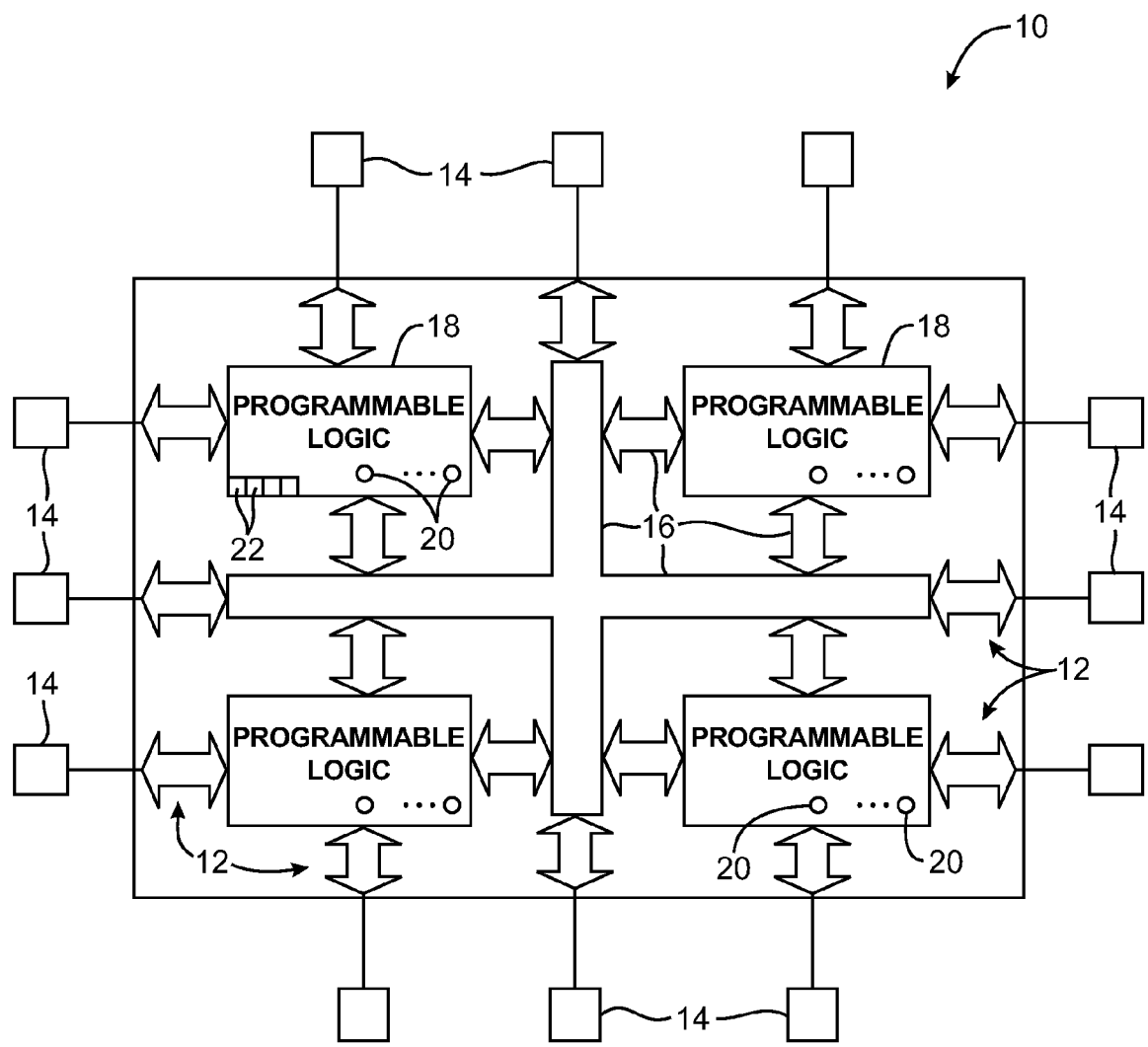
FIG. 1 is a diagram of an illustrative programmable logic device integrated circuit in accordance with an embodiment of the present invention.

An illustrative programmable logic device 10 in accordance with the present invention is shown in FIG. 1.

Programmable logic device 10 has input/output circuitry 12 for driving signals off of device 10 and for receiving signals from other devices via input/output pins 14. Interconnection resources 16 such as global and local vertical and horizontal conductive lines and busses may be used to route signals on device 10. Interconnection resources 16 include conductive lines and programmable connections between respective conductive lines and are therefore sometimes referred to as programmable interconnects 16.

Programmable logic 18 may include combinational and sequential logic circuitry. The programmable logic 18 may be configured to perform a custom logic function. The programmable interconnects 16 may be considered to be a type of programmable logic 18.

Programmable logic device 10 contains programmable memory elements 20. Memory elements 20 can be loaded with configuration data (also called programming data) using pins 14 and input/output circuitry 12. Once loaded, the memory elements each provide a corresponding static control signal that controls the operation of an associated logic component in programmable logic 18. In a typical scenario, the outputs of the loaded memory elements 20 are applied to the gates of metal-oxide-semiconductor transistors in programmable logic 18 to turn certain transistors on or off and thereby configure the logic in programmable logic 18 and routing paths. Programmable logic circuit elements that may be controlled in this way include parts of multiplexers (e.g., multiplexers used for forming routing paths in programmable interconnects 16), look-up tables, logic arrays, AND, OR, NAND, and NOR logic gates, pass gates, etc.

Memory elements 20 may use any suitable volatile and/or non-volatile memory structures such as random-access-memory (RAM) cells, fuses, antifuses, programmable read-only-memory memory cells, mask-programmed and laser-programmed structures, combinations of these structures, etc. Because memory elements 20 are loaded with configuration data during programming, memory elements 20 are sometimes referred to as configuration memory, configuration RAM, or programmable memory elements.

The circuitry of device 10 may be organized using any suitable architecture. As an example, the logic of programmable logic device 10 may be organized in a series of rows and columns of larger programmable logic regions each of which contains multiple smaller logic regions. The smaller regions may be, for example, regions of logic that are sometimes referred to as logic elements, each containing a four-input look-up table, one or more registers, and programmable multiplexer circuitry. The larger regions may be, for example, logic array blocks containing multiple logic elements. In the example of FIG. 1, illustrative logic elements 22 are shown in one of the larger regions of programmable logic 18 in FIG. 1. In a typical programmable logic device 10, there may be hundreds or thousands of logic elements 22. The four logic elements 22 that are shown in FIG. 1 are merely illustrative.

During device programming, configuration data is loaded into device 10 that configures the logic elements 22 so that each logic element performs a desired logic function on its inputs and produces corresponding output signals at one or more logic element outputs.

The resources of device 10 such as programmable logic 18 may be interconnected by programmable interconnects 16. Interconnects 16 generally include vertical and horizontal conductors. These conductors may include global conductive lines that span substantially all of device 10, fractional lines such as half-lines or quarter lines that span part of device 10, staggered lines of a particular length (e.g., sufficient to interconnect several logic array blocks or other such logic areas), smaller local lines, or any other suitable interconnection resource arrangement. If desired, the logic of device 10 may be arranged in more levels or layers in which multiple large regions are interconnected to form still larger portions of logic. Still other device arrangements may use logic that is not arranged in rows and columns.

In addition to the relatively large blocks of programmable logic that are shown in FIG. 1, the device 10 generally also includes some programmable logic associated with the programmable interconnects, memory, and input-output circuitry on device 10. For example, input-output circuitry 12 may contain programmable input and output buffers. Interconnects 16 may be programmed to route signals to a desired destination.

Much of the logic circuitry on device 10 contains storage elements referred to as flip-flops. Flip-flops are edge triggered devices that can store digital data (e.g., a logic one or a logic zero).

Figure 2:
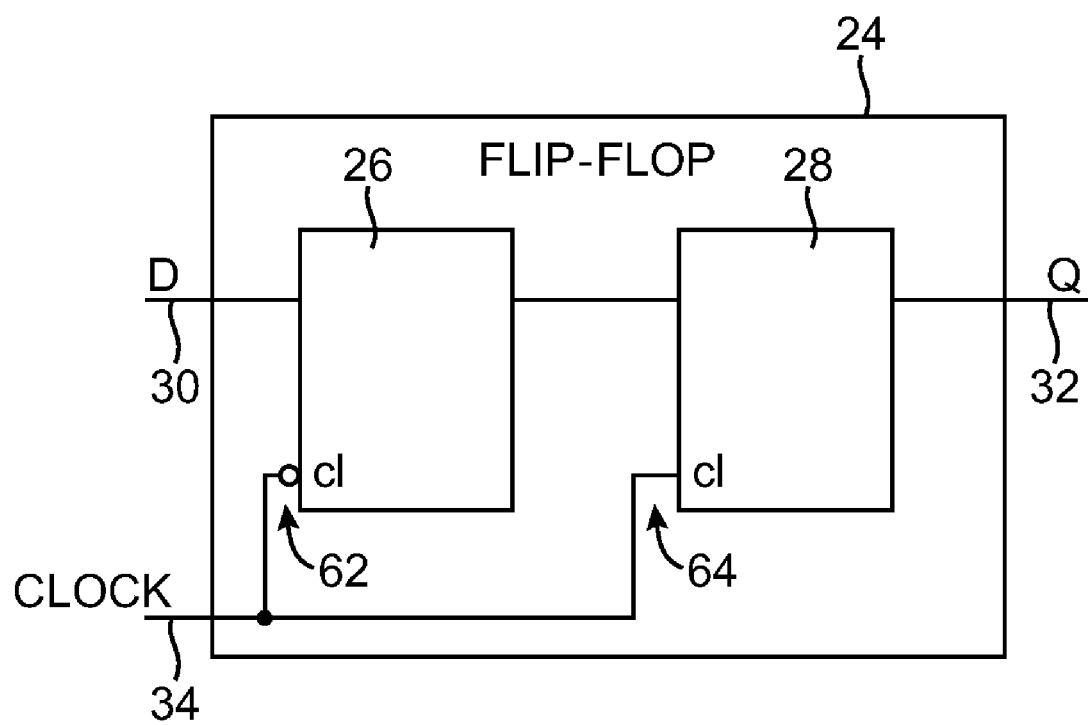
FIG. 2 is a diagram of a conventional flip-flop.

A conventional flip-flop 24 is shown in FIG. 2. Flip-flop 24 has a data input line 30 and a data output line 32. Level sensitive latches 26 and 28 are used to store data. Latches 26 and 28 are clocked by clock signal CLOCK at clock input line 34. Latch 26 has an inverting clock input 62. Latch 28 has a non-inverting clock input 64. Because input 62 is inverted with respect to input 64, latches 26 and 28 are effectively clocked with clock signals that are 180° out of phase. Latch 26 responds to an inverted clock signal and latch 28 responds to noninverted clock signal CLOCK.

Conventional flip-flops such as flip-flop 24 of FIG. 2 are characterized by a setup time Tsu, a hold time Th, and a clock-to-output time Tco.

The setup time Tsu of a flip-flop represents the minimum amount of time that data D on input line 30 must be valid before the signal CLOCK goes high on clock input 34 and its inverse goes low at the input 62 of latch 26. If data is presented to input 30 at a time that is closer in time to the clock edge than Tsu, proper operation of the flip-flop 24 cannot be guaranteed.

Figure 3:
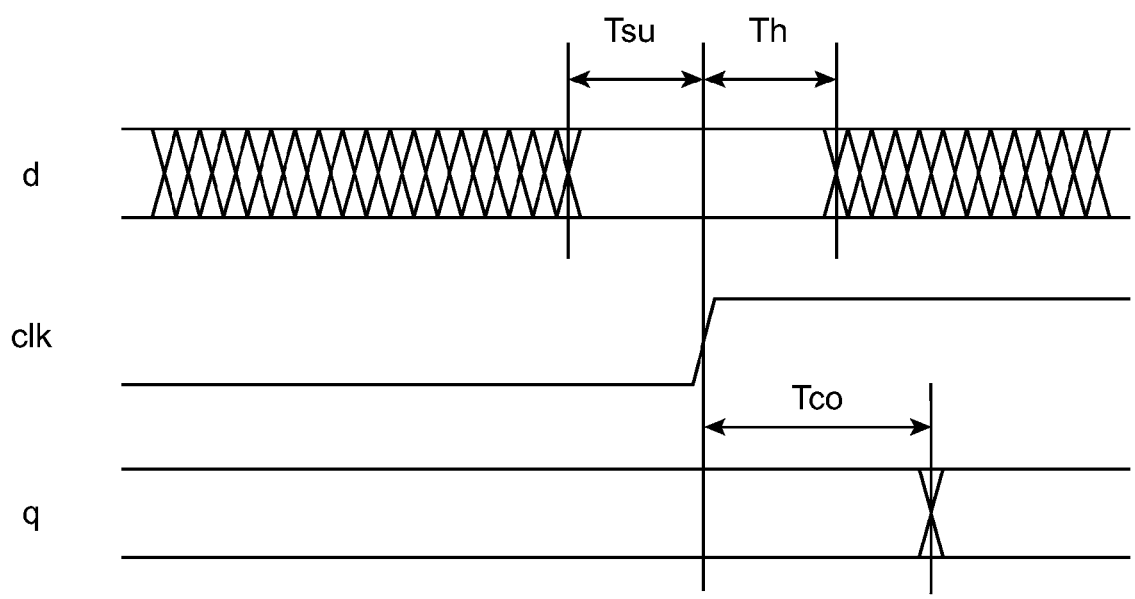
FIG. 3 is a timing diagram showing definitions for timing constraints in a configurable time borrowing flip-flop in accordance with an embodiment of the present invention.

The hold time Th relates to the behavior of latch 26 and represents the minimum amount of time that the data D is required to be stable after the CLOCK edge (i.e., after the inverse of CLOCK falls). If D changes state before Th is complete, the output Q of the flip-flop may not be correct. The clock-to-output time Tco represents the amount of time the flip-flop takes to change its output after the clock edge. These relationships are illustrated in the graph of FIG. 3.

Figure 4:
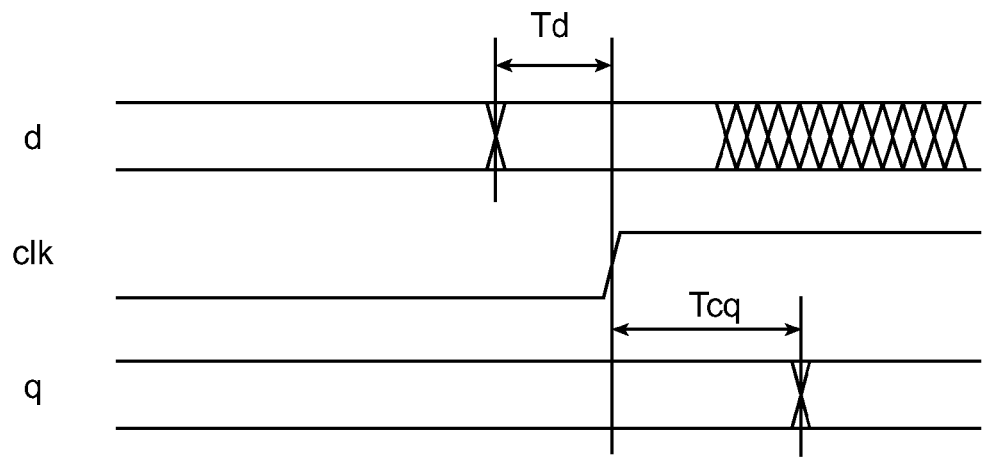
FIG. 4 is a timing diagram showing definitions of timing variables for a configurable time borrowing flip-flop in accordance with an embodiment of the present invention.

Although the data D that is presented to a flip-flop's input must be stable at least Tsu before the clock edge, there is no prohibition on data arriving at earlier times. The amount of time before the clock edge that stable data is presented at the input to a flip-flop may be referred to as Td, as shown in the diagram of FIG. 4. The variable Tcq in FIG. 4 represents the amount of time after the edge of the clock signal CLK that output data Q is stable for a given value of Td. In some situations, data may be presented very close in time to the clock edge (e.g., close to or at the minimum established by the setup time Tsu). In this type of situation, Td will equal Tsu (or will be very close to Tsu). In other situations, data may be presented farther from the clock edge. In this type of situation, Td will be greater than Tsu.

Figure 5:
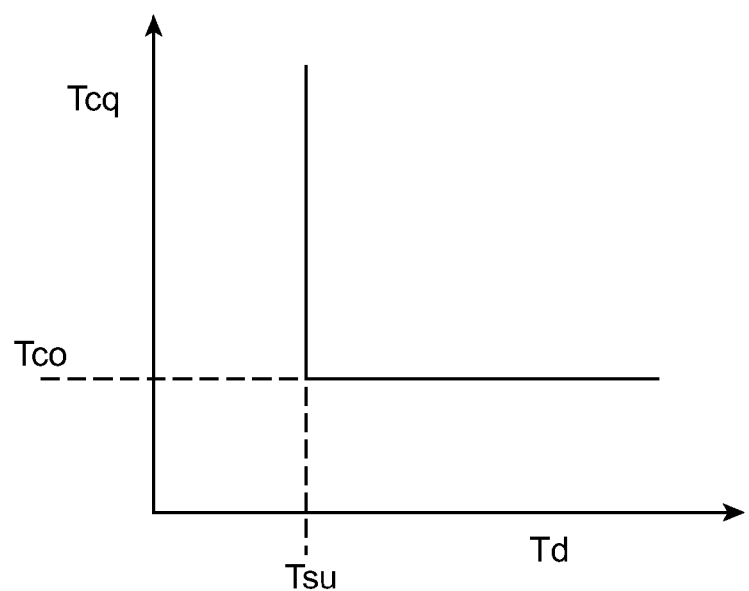
FIG. 5 is a graph showing an idealized relationship between flip-flop timing variables in accordance with an embodiment of the present invention.

The values of Td and Tcq are interrelated. The variable Td can be adjusted, while the variable Tcq is a function of Td. A graph showing the relationship between Td and Tcq for an idealized conventional flip-flop of the type shown in FIG. 2 is shown in FIG. 5. The horizontal axis in the graph of FIG. 5 represents the variable Td (i.e., the actual time difference between the data edge and the rising clock edge). The vertical axis in the graph of FIG. 5 represents the variable Tcq (i.e., the actual time between the rising clock edge and the data becoming valid at the flip-flop output).

As shown by the graph of FIG. 5, at Td values that are greater than or equal to Tsu, the flip-flop is expected to work properly, with a Tcq value of Tco (i.e., Tcq will be equal to the minimum amount of time required for the output to become valid after the clock edge—Tco). At Td values below Tsu, however, the setup time requirements of the flip-flop are violated because the data is arriving too close to the clock edge. In this situation, no valid data will be presented to the output of the flip-flop and the flip-flop will not perform properly.

With conventional flip-flops of the type shown in FIG. 2 (having Tcq versus Td characteristics of the type shown in FIG. 5), time borrowing is not possible, which limits circuit performance. Consider, as an example, the illustrative circuit 74 of FIG. 6. In circuit 74, data is processed in a loop formed from flip-flop 76, logic circuit 78, flip-flop 80, and logic circuit 82.

Figure 6:
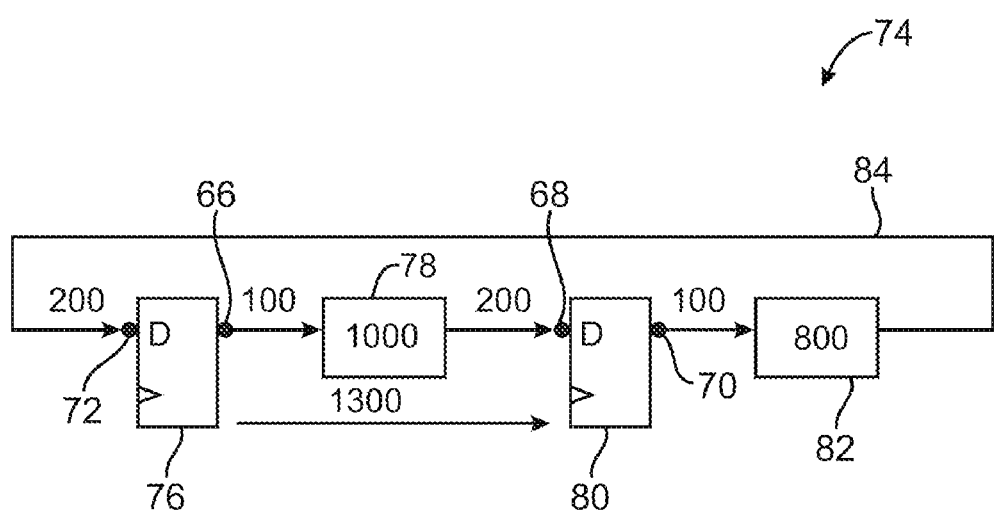
FIG. 6 is a diagram showing how a worst-case path in a circuit can limit clock frequency in conventional circuits.

In the example of FIG. 6, flip-flops 76 and 80 are conventional flip-flops without time borrowing capabilities, as described in connection with FIGS. 2 and 5. As a result, flip-flops 76 and 80 have fixed values of Tsu and Tco. In the FIG. 6 example, the value of Tsu for flip-flops 76 and 80 is 200 ps and the value of Tco for flip-flops 76 and 80 is 100 ps. As shown in FIG. 6, logic circuit 78 (in this example) has an associated processing delay of 1000 ps. Logic circuit 82 has an associated delay of 800 ps. Output signals from logic 82 are fed back to logic circuit 78 via feedback path 84.

In circuits such as circuit 74, the maximum clock frequency that can be used is dictated by the worst-case path delay. There are two relevant path delays to consider in circuit 74. The delay of the first path is associated with the path from point 66 to point 68. Note that although Tsu and Tco are associated with the internal logic of the flip-flop, they are considered to be part of the path in this discussion and are illustrated as being outside of the flip-flop. The delay of the first path is equal to 1300 ps (100 ps+1000 ps+200 ps). The delay of the second path is associated with the path from point 70 to point 72. This delay is equal to 1100 ps (100 ps+800 ps+200 ps). Because the delay associated with the slowest path is the limiting factor in determining the maximum clock speed, the maximum clock speed that can be used in clocking circuit 74 is governed by the path delay of 1300 ps that is associated with the path from point 66 to point 68. Even though the delay associated with the path from point 70 to point 72 is lower (1100 ps), this smaller delay cannot be exploited using conventional flip-flops. As a result, it is necessary to set the clock rate for circuit 74 to a frequency of about 1/(1300 ps) or 769 MHz.

Figure 7:
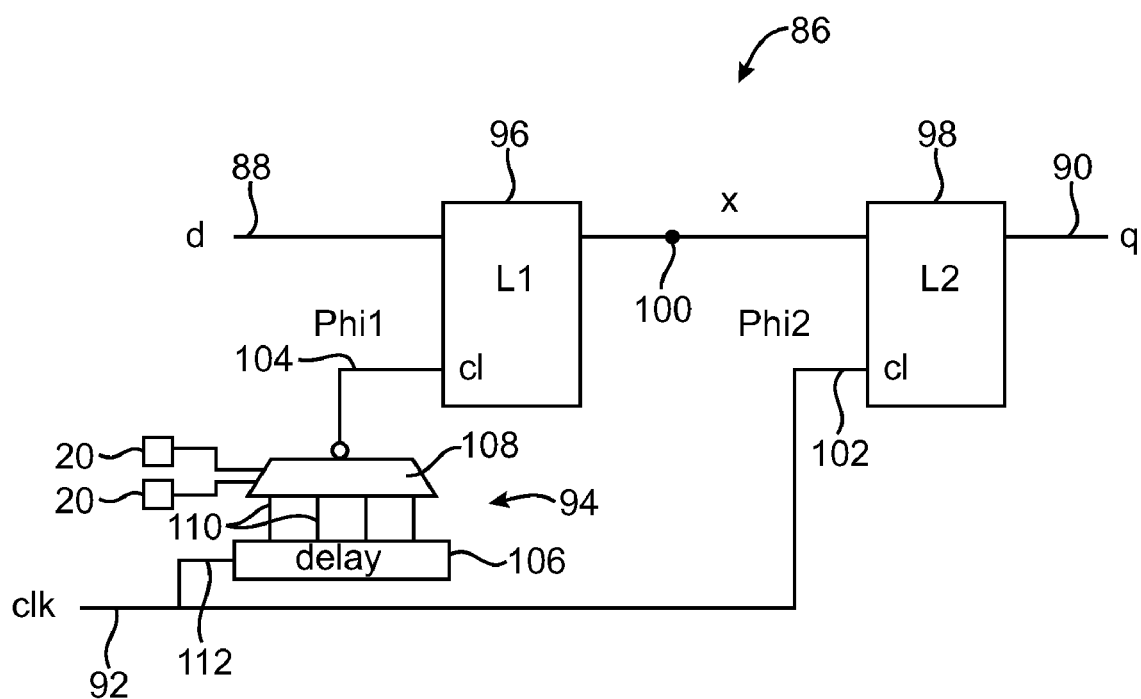
FIG. 7 is a diagram of a configurable time borrowing flip-flop based on two latches in accordance with an embodiment of the present invention.

A configurable time borrowing flip-flop in accordance with an embodiment of the invention is shown in FIG. 7. As shown in FIG. 7, flip-flop 86 has a data input line 88 at which input data D is received and has a corresponding data output line 90 at which output data Q is presented. Flip-flop 86 has two latches 96 and 98, which are sometimes referred to as latches L1 and L2. The data signal on intermediate node 100 is sometimes referred to as signal X.

Clock signals CLK are received at clock input line 92. A version of CLK that is not inverted may be provided to clock input 102 of latch L2 and may serve as the reference clock for flip-flop 86. This clock signal is sometimes referred to as PHI2.

Latch L1 is clocked using a version of signal CLK into which a controllable amount of delay has been inserted. (This version of the clock signal is sometimes called PHI1). Any suitable circuitry may be used to produce a configurable time delay for clock signal PHI1. In the example of FIG. 7, configurable delay is produced using configurable delay circuit 94.

Circuit 94 has a multiplexer 108. The output of multiplexer 108 is inverting, so the phase of clock signal PHI1 is nominally shifted by 180° with respect to the phase of clock signal PHI2 (i.e., PHI1 is nominally the inverse of PHI2).

The setting of multiplexer 108 is controlled by programmable elements 20. In the example of FIG. 7, there are two associated programmable elements 20 for configurable delay circuit 94, so there are four ($2^2$) possible delay settings for circuit 94. This is merely illustrative. In general, any suitable number of programmable elements 20 may be used in circuit 94. Use of more programmable elements 20 allows circuit 94 to be adjusted with more precision, but adds additional overhead.

Delay element 106 receives clock signal CLK at its input 112 and produces four different corresponding delayed versions of CLK at each of its outputs 110. Delay element 106 may, as an example, contain a delay chain with multiple output tap points to produce delays of 100 ps, 200 ps, 300 ps, and 400 ps (as an example). The amount of delay that is produced by configurable delay circuit 94 is sometimes referred to as Tsk. By adjusting the setting of multiplexer 108 by loading appropriate configuration data into its associated programmable elements 20, desired delay values Tsk of 100 ps, 200 ps, 300 ps, or 400 ps may be produced. In general, delay element 106 may produce delays of any suitable increment. The use of 100 ps delay increments is merely illustrative.

Flip-flop 86 supports time borrowing. Consider, as an example, the situation in which the delay time Tsk for circuit 94 is set to 100 ps. In this case, flip-flop 86 will exhibit a Tcq versus Td characteristic of the type shown by line 114 in FIG. 8. As shown by line 114, flip-flop 86 supports a range of different Tcq and Td values.

Figure 8:
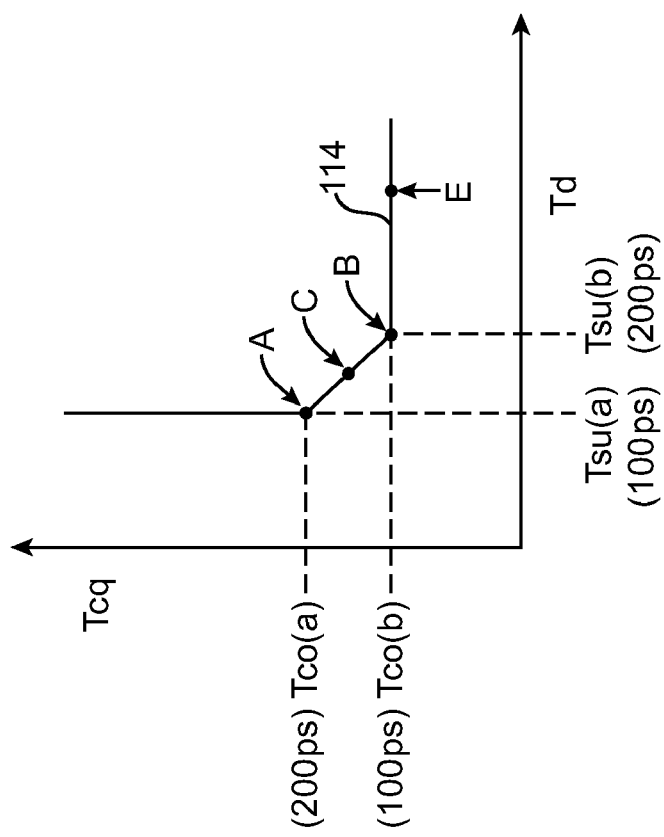

In the FIG. 8 example, the value of Tsu(a) is 100 ps, the value of Tsu(b) is 200 ps, the value of Tco(a) is 100 ps, and the value of Tco(b) is 200 ps. Flip-flop 86 may be used in a circuit in which data D is presented more than Tsu(b) before the clock edge (i.e., Td>Tsu(b)). In this situation (represented by point E in FIG. 8), flip-flop 86 may be characterized by a Tcq value of Tco(b) (i.e., the minimum Tco possible). When data D is presented so that Td=Tsu(b), the circuit operates at point B. Data may also be presented closer to the clock edge. For example, if Td lies between Tsu(a) and Tsu(b), flip-flop 86 will operate at point C with a Tcq value that lies between minimum value Tco(b) and maximum value Tco(a). Operating flip-flop 86 in a circuit environment in which Td=Tsu(a), will produce a Tcq value of Tco(a).

Figure 9:
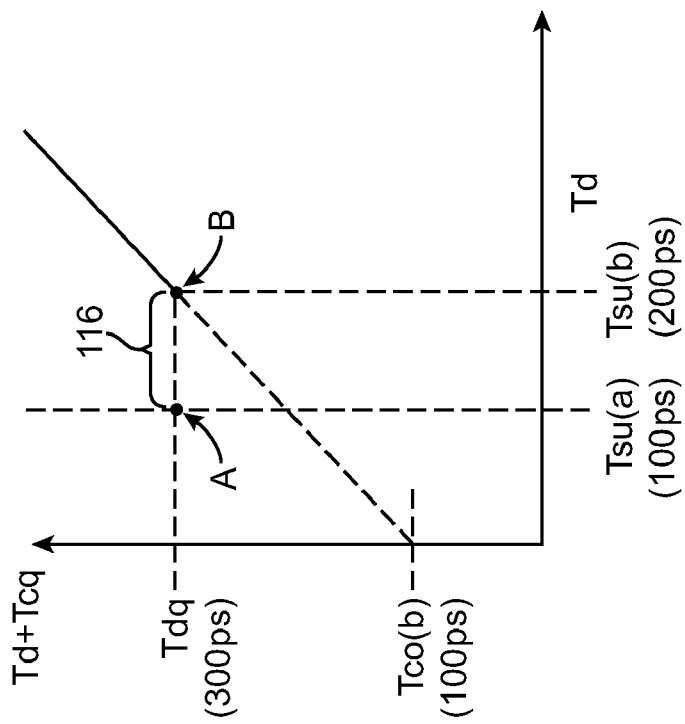
FIGS. 8 and 9 are graphs showing relationships between timing variables for a configurable time borrowing flip-flop with a particular time borrowing setting in accordance with an embodiment of the present invention.

FIG. 9 includes a graph in which the total delay of the flip-flop 86 of FIG. 8 (Td+Tcq) is plotted as a function of Td. As shown in FIG. 9, there is a 100 ps range 116 in which the total delay between when a stable D is presented at the input of flip-flop 86 and when a valid value of Q is presented at the output of flip-flop 86 is constant. When operating flip-flop 86 in range 116, flip-flop 86 produces its minimum delay characteristic, while supporting time borrowing.

Figure 10:
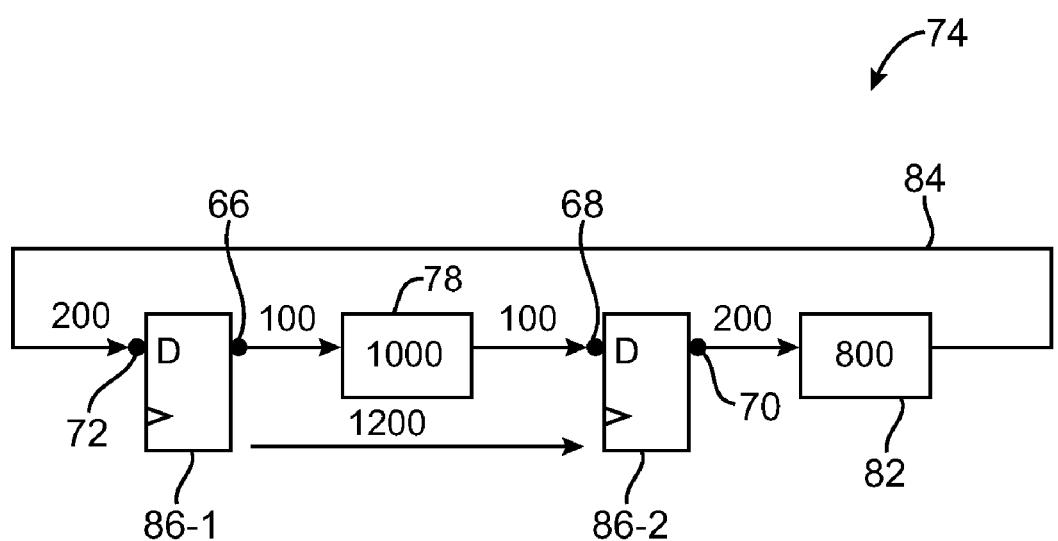
FIG. 10 is a diagram showing how the performance of a circuit of the type shown in FIG. 6 can be improved using configurable time borrowing flip-flops in accordance with an embodiment of the present invention.

The time borrowing characteristic of flip-flop 86 allows the clock speed of illustrative circuit 74 of FIG. 6 to be increased. Consider, as an example, the arrangement of FIG. 10. In FIG. 10, circuit 74 is using configurable time-borrowing flip-flops 86-1 and 86-2 in place of conventional flip-flops 76 and 80 of FIG. 6. Unlike the arrangement of FIG. 6 in which each flip-flop has a fixed Tsu value of 200 ps and a fixed Tco value of 100 ps, the flip-flops 86-1 and 86-2 of FIG. 10 can operate anywhere in the range 116 (FIG. 9), while still producing the same total amount of overall delay Tdq.

In the FIG. 10 example, flip-flop 86-1 is operated with a Tsu value of 200 ps and a Tco value of 100 ps (as with flip-flop 76 of FIG. 6), corresponding to point B in FIGS. 8 and 9. Flip-flop 86-2 of FIG. 10 operates with a Tsu value of 100 ps and a Tco value of 200 ps, corresponding to point A in FIGS. 8 and 9. As demonstrated by range 116 of the graph in FIG. 9, both flip-flop timing environments result in an identical Tdq value (300 ps). Nevertheless, operating flip-flop 86-2 at operating point A of FIGS. 8 and 9 results in an improved balance for the delays associated with the paths in circuit 74.

In particular, the delay associated with the path between point 66 and 68 is reduced to 1200 ps from 1300 ps with the arrangement of FIG. 6, whereas the delay associated with the path between point 70 and 72 is increased to 1200 ps from 1100 ps with the arrangement of FIG. 6. Although one path is made slower than before, the other path is made faster and, on balance, the entire circuit 74 can operate more rapidly. This is because the maximum clock speed of the clock for circuit 74 is dictated by the worst case delay. In the example of FIG. 6, the maximum clock frequency for circuit 74 was 1/(1300 ps). In the example of FIG. 10, the maximum clock frequency for circuit 74 has been increased to 1/(1200 ps) or 833 MHz. This improvement in circuit performance is the result of time borrowing by flip-flop 86-2.

Figure 11:
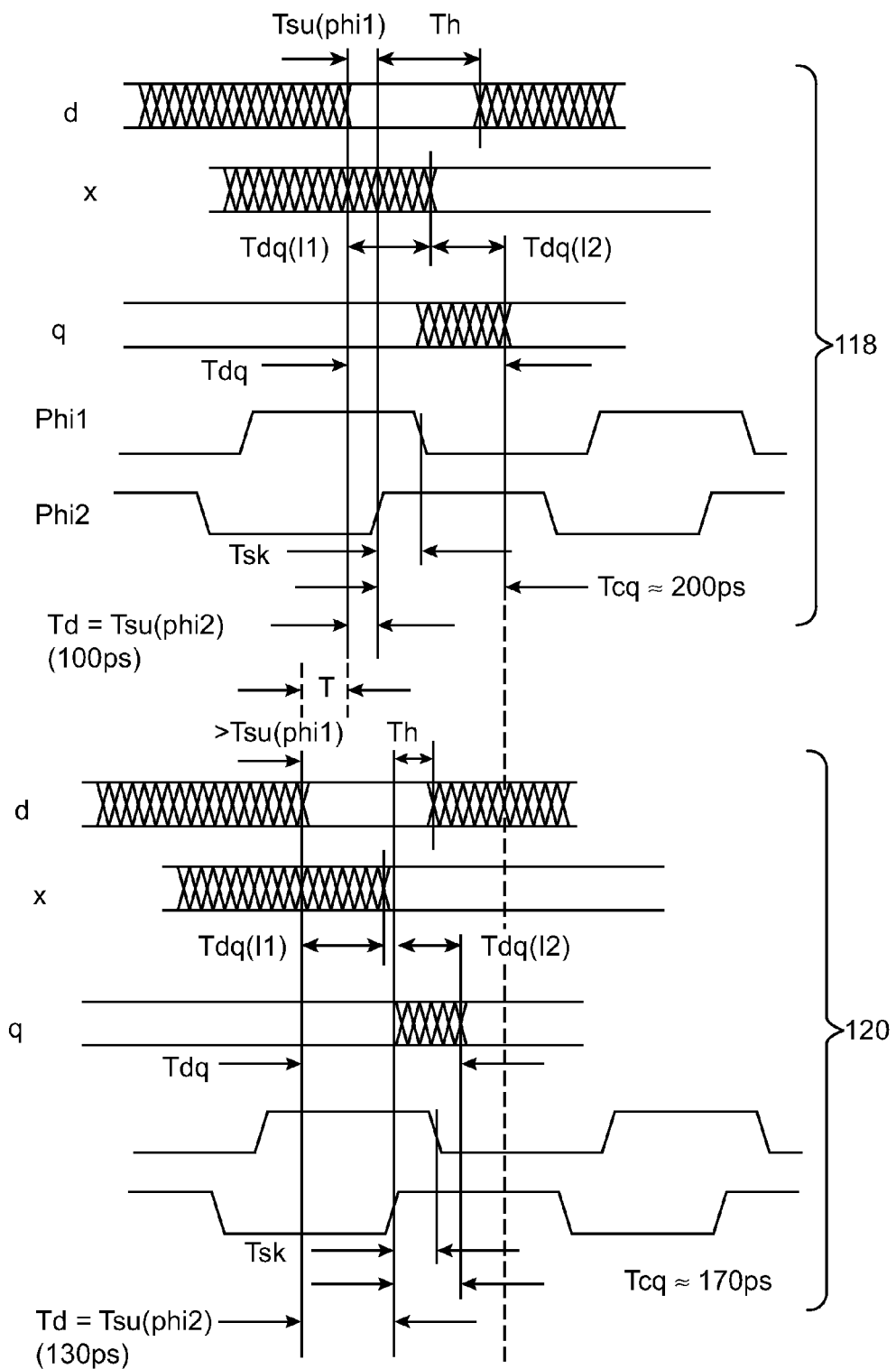
FIG. 11 is a timing diagram showing how configurable time borrowing flip-flops of the type shown in FIG. 6 operate in accordance with an embodiment of the present invention.

FIG. 11 shows timing diagrams corresponding to the operation of a time-borrowing flip-flop 86 under a Tsk setting of 100 ps for operating points A and C of FIGS. 8 and 9. The upper portion 118 of FIG. 11 corresponds to a Td value of 100 ps and operating point A. The lower portion 120 of FIG. 11 corresponds to a Td value of 130 ps and operating point C.

The value Tsu(PHI1) that is shown in the D trace in portion 118 represents that amount of time that D must be valid before clock signal PHI1 goes low and latches latch L1. When PHI1 goes low, the output of latch L1 becomes fixed and no longer tracks data D.

The parameter Tsk represents the amount of delay that is produced by configurable delay circuit 94. The non-zero value of Tsk ensures that clock signal PHI1 is delayed by Tsk relative to reference clock signal PHI2, as shown in the PHI1 and PHI2 traces of portion 118. As a result of the delay between PHI1 and PHI2, latch L1 latches its input data Tsk (100 ps) later than otherwise would be the case, providing latch L1 more time to operate.

Because data D is now allowed to transition up to Tsk later than before, the setup time for latch L2 (i.e., the time that data D must be valid before PHI2 goes high and enables latch L2)

is reduced. The value of Tsu(PHI2) is equal to the value of Tsu(PHI1) minus the value of Tsk.

Because Tsu(PHI2) is reduced, the output X of latch L1 becomes valid Tsk later than previously, as shown by the X trace in portion 118. After PHI2 goes high, the value of X is passed by latch L2 to the flip-flop output line 90 as output data Q. As shown by the Q trace in portion 118, output signal Q becomes valid Tsk later than would be the case for a configuration without delay. As a result, the clock-to-output time of the flip-flop 86 is increased by Tsk. At the same time, the setup time of the flip-flop has decreased by Tsk. As shown in FIGS. 8 and 9, the situation in which flip-flop 86 is operating with a reduced Tsu of 100 ps and an increased Tco of 200 ps is represented by point A.

When operating at point A, data D is arriving as early as possible with respect to the clock edge. When operating at point C of FIGS. 8 and 9, corresponding to the traces in portion 120 of FIG. 11, data D is arriving a time T earlier than shown in portion 118 of FIG. 11. The time at which Q is valid is given by Tdq(L1)+Tdq(L2). This total time is constant at 300 ps and is the same for both operating point A (portion 118) and operating point C (portion 120).

If data D arrives even earlier in time relative to the clock edge, flip-flop 86 will operate at point B, as described in connection with FIGS. 8 and 9.

In portion 118 of FIG. 11, flip-flop 86 is operated at a Td value of Tsu(a) (point A), which represents the closest that the data edge can be located to the falling edge of clock signal PHI1. However, flip-flop 86 still operates properly if data arrives earlier, as shown in portion 120. If the edge of data signal D arrives Tsk earlier, intermediate data signal X will transition at a time that is Tsk earlier and output data Q will transition at a time that is Tsk earlier (point B). If D changes by a fraction of Tsk earlier, signals X and Q will change by the same fraction of Tsk earlier, leading to operation at point C. If data D arrives more than Tsk earlier than the clock edge, the value of Tcq will be fixed at Tco(b) (operation at point E), as shown in FIG. 8.

Because the clock delay for latch L1 is configurable using configurable delay circuit 94, the value of Tsk can be adjusted by suitable selection of configuration data for the programmable elements 20 that are associated with configurable delay circuit 94. If the value of Tsk is adjusted upward, data D that is even later (i.e., data signals D with data edges that are closer to the edge of PHI2 and that therefore have smaller Tsu(PHI2) values) are supported.

In a properly operating circuit, data D must satisfy the hold time (Th) constraints of flip-flop 86 with respect to clock PHI1 (i.e., data D much be valid by Th after PHI1 transitions). Due to the presence of configurable delay circuit 94, the clock signal PHI1 for latch L1 is delayed by Tsk relative to clock PHI2. As a result, the hold time Th is increased by Tsk, as shown in FIG. 11. To avoid excessively large hold times (which could potentially lead to the latching of incorrect data from the next cycle), a computer-aided design (CAD) tool is used to perform a timing analysis on the circuit that is being designed. The timing analysis determines a suitable setting for the configurable delay circuit 94 in each flip-flop 86.

As a result of the timing analysis, it is possible to select the values of Tsk for various flip-flops 86 so that relatively more time borrowing takes place in circuit environments that have relatively larger amounts of hold time available, without choosing excessive Tsk values that could lead to incorrect data latching in certain portions of the circuit. In general, it is desirable to use relatively large Tsk values whenever data signal D is arriving late and there is ample hold time available. CAD software may arrange to insert extra delays in certain non-critical paths to ensure that sufficient hold time is available for flip-flops that have a critical path that can benefit from time borrowing.

Figure 12:
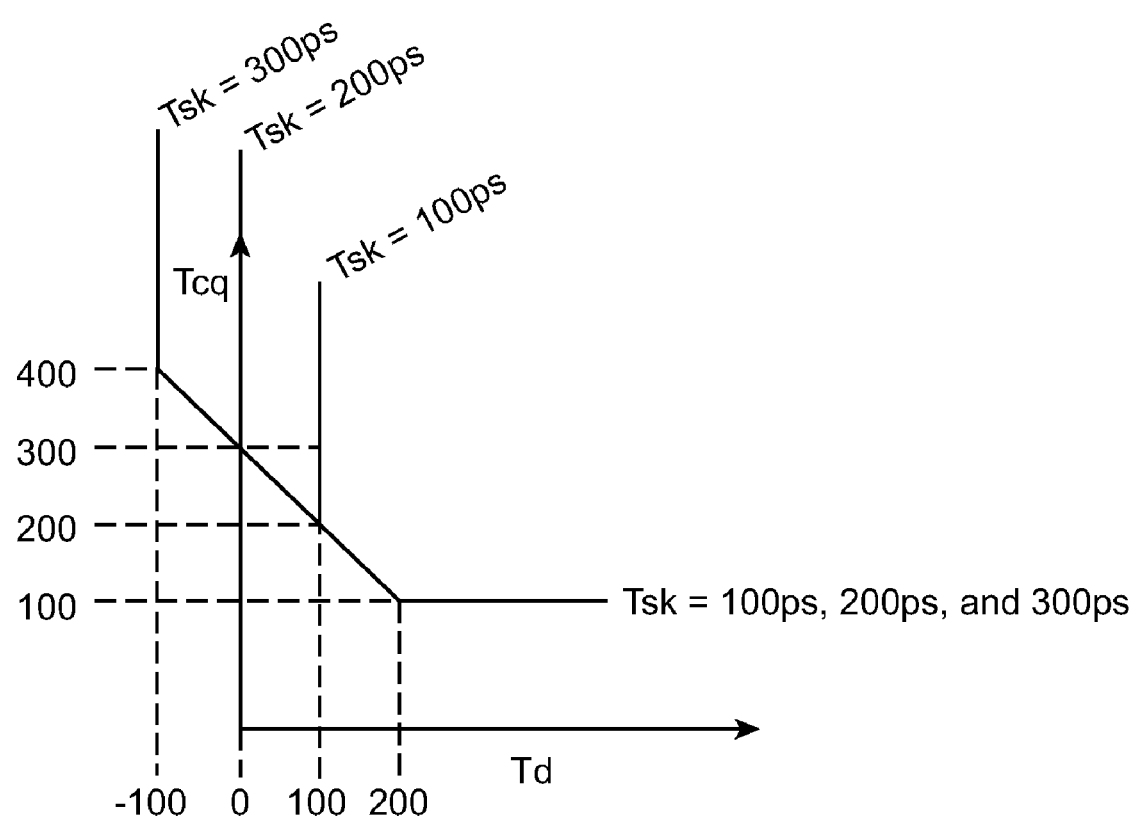
FIGS. 12 and 13 are graphs showing relationships between timing variables for a configurable time borrowing flip-flop with various different time borrowing settings in accordance with an embodiment of the present invention.
Figure 13:
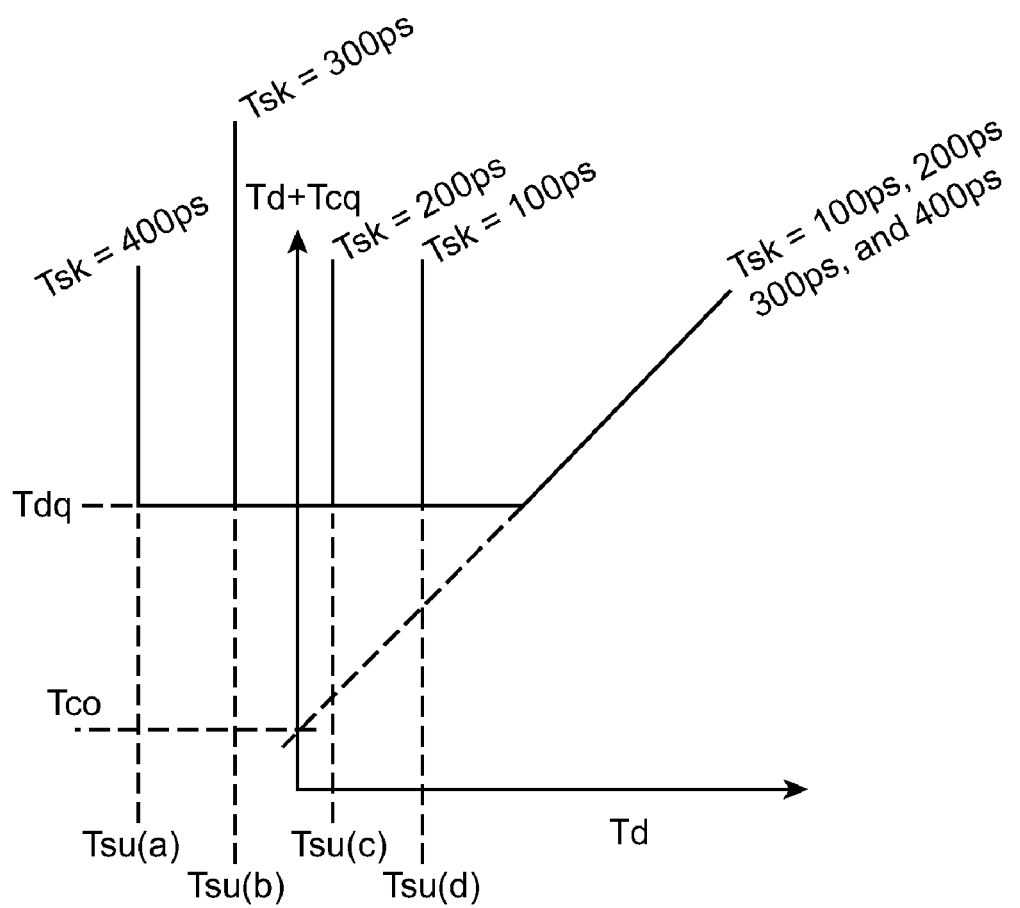

A family of curves is associated with FIGS. 8 and 9 that reflect the characteristics of flip-flop 86 under different settings for Tsk. FIG. 12 shows an illustrative family of curves for a graph of the type shown in FIG. 8 under various Tsk settings. FIG. 13 shows an illustrative family of curves for a graph of the type shown in FIG. 9 under various Tsk settings. As the graph of FIG. 13 illustrates, the range of available time borrowing increases with increasing Tsk. Whenever hold times permit, it may be desirable to increase Tsk to maximize the potential for time borrowing.

Detailed knowledge of which portions of a circuit can tolerate larger Tsk values and which portions of a circuit require relatively low Tsk values can be provided using computer-aided design (CAD) circuit design tools.

Figure 14:
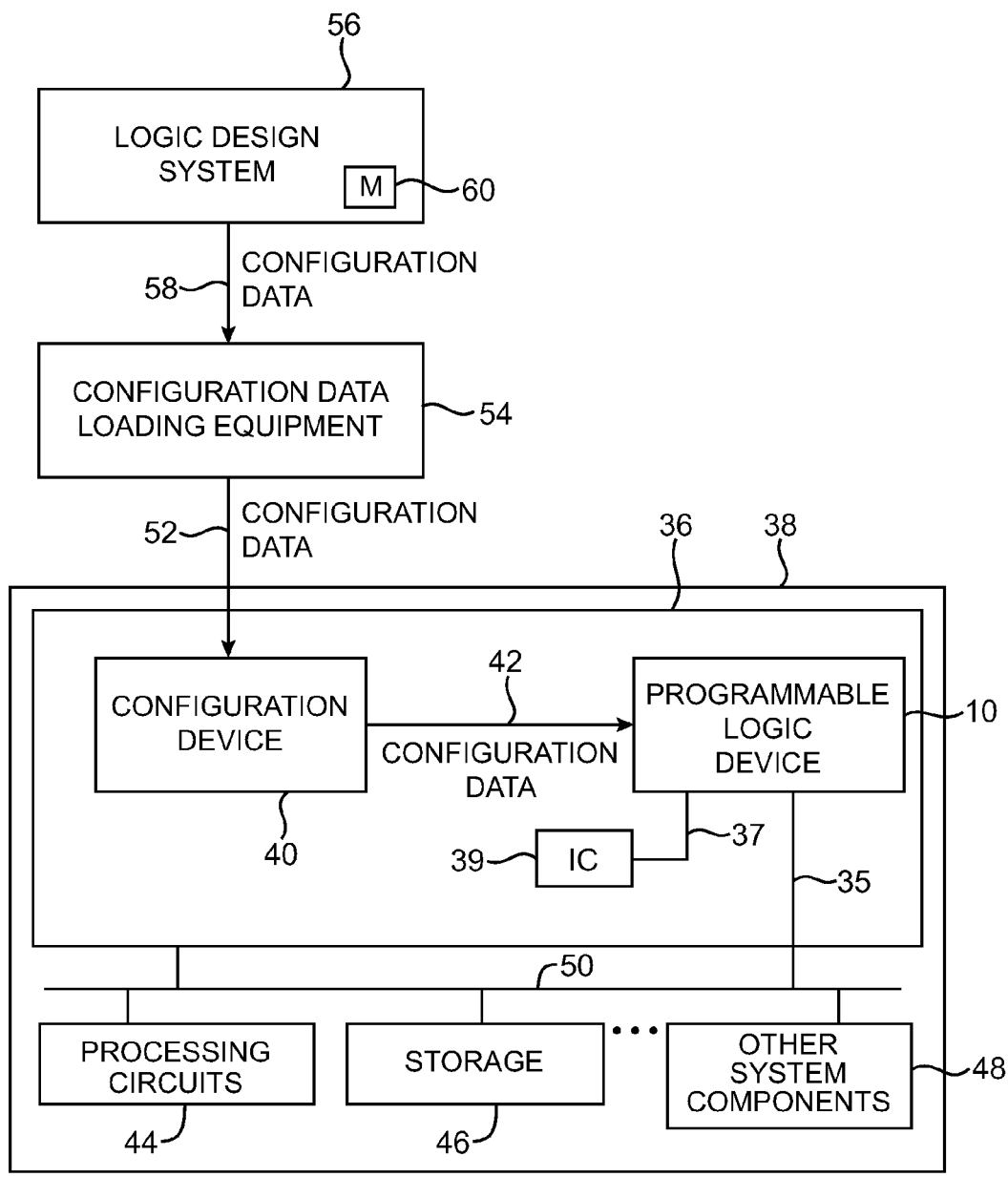
FIG. 14 is a diagram of an illustrative system environment in which a programmable circuit containing configurable time borrowing flip-flops may be used in accordance with an embodiment of the present invention.

An illustrative system environment for programmable integrated circuits that contain configurable time borrowing flip-flops 86 is shown in FIG. 14. Programmable logic device 10 (or any other suitable integrated circuit containing flip-flops 86) may be mounted on a board 36 in a system 38. Programmable logic device 10 may receive configuration data from programming equipment or from any other suitable equipment or device.

In the example of FIG. 14, programmable logic device 10 is the type of programmable logic device that receives configuration data from an associated integrated circuit 40. With this type of arrangement, circuit 40 may, if desired, be mounted on the same board 36 as programmable logic device 10. The circuit 40 may be an erasable-programmable read-only memory (EPROM) chip, a programmable logic device configuration data loading chip with built-in memory (sometimes referred to as a configuration device), or any other suitable device. When system 38 boots up (or at another suitable time), the configuration data for configuring the programmable logic device may be supplied to the programmable logic device from device 40, as shown schematically by path 42. The configuration data that is supplied to the programmable logic device may be stored in the programmable logic device in its configuration random-access-memory elements 20.

System 38 may include processing circuits 44, storage 46, and other system components 48 that communicate with device 10. The components of system 38 may be located on one or more boards such as board 36 or other suitable mounting structures or housings.

Communication paths may be used to interconnect device 10 to other components. For example, communication path 37 may be used to convey data between an integrated circuit 39 that is mounted on board 36 and programmable logic device 10. Communication paths 35 and 50 can be used to convey signals between programmable logic device 10 and components 44, 46, and 48.

Configuration device 40 may be supplied with the configuration data for device 10 over a path such as path 52. Configuration device 40 may, for example, receive the configuration data from configuration data loading equipment 54 or other suitable equipment that stores this data in configuration device 40. Device 40 may be loaded with data before or after installation on board 36.

It can be a significant undertaking to design and implement a desired logic circuit in a programmable logic device. Logic designers therefore generally use logic design systems based on computer-aided-design (CAD) tools to assist them in designing circuits. A logic design system can help a logic designer design and test complex circuits for a system. When a design is complete, the logic design system may be used to generate configuration data for electrically programming the appropriate programmable logic device.

As shown in FIG. 14, the configuration data produced by a logic design system 56 may be provided to equipment 54 over a path such as path 58. The equipment 54 provides the configuration data to device 40, so that device 40 can later provide this configuration data to the programmable logic device 10 over path 42. System 56 may be based on one or more computers and one or more software programs. In general, software and data may be stored on any computer-readable medium (storage) in system 56 and is shown schematically as storage 60 in FIG. 14.

In a typical scenario, logic design system 56 is used by a logic designer to create a custom circuit design. The system 56 produces corresponding configuration data which is provided to configuration device 40. Upon power-up, configuration device 40 and data loading circuitry on programmable logic device 10 is used to load the configuration data into the programmable memory elements 20 of device 10. Device 10 may then be used in normal operation of system 38.

Figure 15:
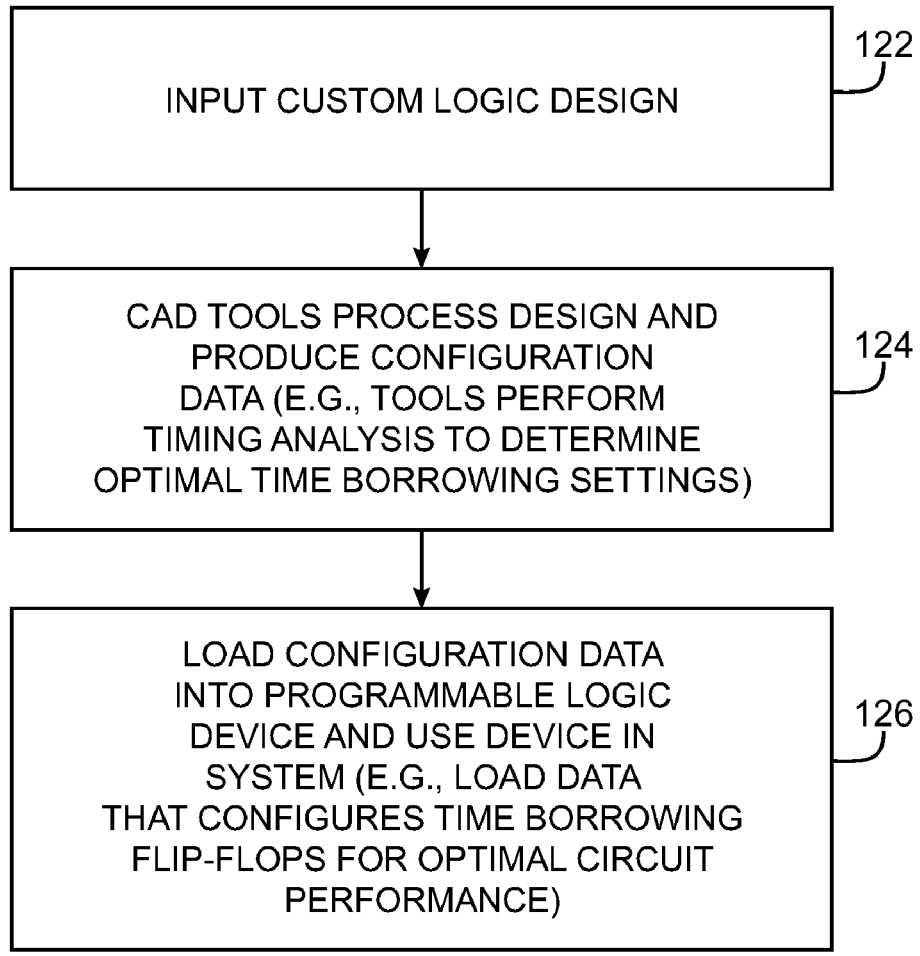
FIG. 15 is a flow chart of illustrative steps involved in designing and configuring a programmable circuit containing configurable time borrowing flip-flops in accordance with an embodiment of the present invention.

Illustrative steps involved in configuring and using a programmable logic device 10 that contains configurable time-borrowing flip-flops 86 are shown in FIG. 15.

At step 122, a user (e.g., a logic designer) creates a custom logic design for a programmable logic device 10 using logic design system 56 (FIG. 14). The user provides computer aided design (CAD) tools on logic design system 56 (FIG. 14) with information on the custom logic design. The input data may be in the form of design data (e.g., specifications for a logic circuit or other circuit) and constraint data (e.g., settings that set limits on acceptable circuit performance and settings that control how the computer aided design tools 12 should process the designer's input). As an example, step 122 may involve the construction and entry of a logic circuit design to be implemented in a particular type of programmable logic device with certain size and timing constraints. The tools used to enter the logic circuit input data include tools such as text editors, floorplan editors, constraint editors, library-based and wizard-based design and constraint entry aids, etc. As another example, the design and constraint data entered at step 122 may relate to a circuit design that is to be implemented as an application specific integrated circuit (ASIC). In this context, a typical computer aided design tool 12 for accepting design and constraint data is a place-and-route tool. In general, any suitable format may be used for design and constraint data. Constraint data may include information on any suitable constraints (e.g., design object placement constraints, timing constraints, area constraints, noise level constraints, power consumption constraints, thermal constraints, etc.) Design and constraint data may be stored in databases on system 56 (storage 60).

At step 124, computer aided design tools on system 56 may be run to implement the circuit design. If, for example, the design is a logic design for a particular type of programmable logic device integrated circuit, CAD tools may be used to implement the logic design in a target technology. The CAD tools may include a logic compiler and other programs of the type that are typically provided as a suite of logic design and analysis tools. Programming data (e.g., in a .pof file) or other suitable output data representing the implemented design may be generated. If the design is a circuit design for an application specific integrated circuit, an application specific integrated circuit place-and-route tool and/or other suitable tools may be used to generate a series of lithographic mask specifications for fabricating the circuit as a silicon chip.

During step 124, analysis operations are performed using analysis tools such as timing analysis tools. The timing analysis performed during step 124 allows logic design system 56 to identify optimum time borrowing settings (i.e., optimum Tsk values) for each flip-flop 86 and its configurable delay circuit 94. With one suitable arrangement, all flip-flops are first initialized to a minimum time borrowing setting. The timing analysis tools may then assign an output time to each flip-flop 86 based on the value max (Tco, Tdq−Td) for that flip-flop. This processes may be iterated until it converges. During a verification operation, the timing analysis tools can check that setup time constraints have been satisfied and that minimum expected data arrival times (for data signals D) do not violate the hold time requirements (Th) for any of the flip-flops. Once verification is complete, the CAD tools can increase the time borrowing setting (Tsk) for each flip-flop that cannot meet setup time constraints. The configuration data that is generated at step 124 includes configuration data for adjusting the configuration delay circuit 94 of each flip-flop 86 to an appropriate delay setting Tsk.

Once an optimum implementation of the custom circuit design has been identified and configuration data for that design has been generated at step 124, the configuration data can be loaded into the programmable logic device 10 (step 126), as described in connection with FIG. 14. The loaded data configures the time borrowing flip-flops 86 so that clock speeds can be made faster than would otherwise be possible.

If desired, time-borrowing flip-flops 86 may be implemented using configurable pulsed latches. As with the configurable time borrowing flip-flop arrangement of FIG. 7, configurable pulsed latch arrangements uses latching circuitry that is transparent (i.e., output tracking input) for a configurable amount of time Tsk to serve as a configurable time borrowing flip-flop.

Figure 16:
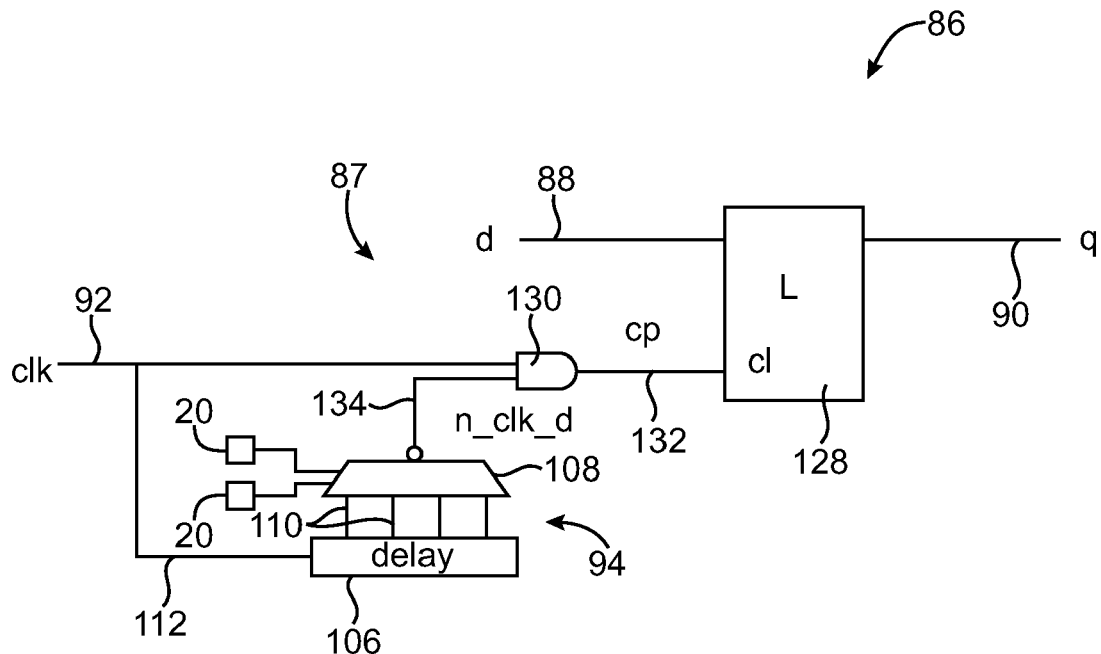
FIG. 16 is a diagram of a configurable time borrowing flip-flop based on a pulsed latch in accordance with an embodiment of the present invention.
Figure 17:
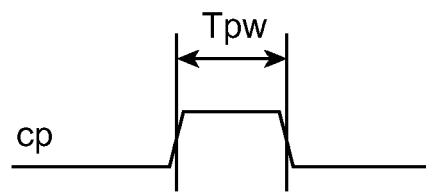
FIG. 17 is a diagram of an illustrative configurable-width clock pulse that may be generated in a circuit of the type shown in FIG. 16 in accordance with an embodiment of the present invention.

An illustrative embodiment of a configurable time borrowing flip-flop 86 based on a pulsed latch is shown in FIG. 16. Flip-flop 86 has a configurable pulse generation circuit 87 that is based on a configurable delay circuit 94. Clock signal CLK is provided on clock input line 92 and is distributed to delay element 106 via input 112. Delay element 106 produces four different delays (in this illustrative example). The clock signal on input 112 is therefore delayed by four corresponding amounts at the outputs 110 of delay element 106. Multiplexer 108, which is adjusted by the states of programmable elements 20, provides a selected one of the delayed versions of the clock signal on line 134 through an inverting output. Logic AND gate 130 receives the delayed clock signal on line 134 and the original clock signal CLK on line 92 and produces a pulse CP of an adjustable width Tpw on its output 132. The delayed clock signal on line 134 is inverted by the inverting output of multiplexer 108, which may be regarded as a phase delay of 180°. An illustrative clock pulse CP is shown in FIG. 17. The width Tpw is determined by the amount of delay selected by multiplexer 108.

The clock pulse CP is provided to the clock input CL of level-sensitive latch 128. Latch 128 receives data D from flip-flop input line 88 and produces corresponding output data Q on flip-flop output line 90. Using configurable pulse generation circuitry 87, the pulse width Tpw can be set to a value that maintains the latch 128 in its transparent state for a time appropriate to implement a desired amount of time borrowing.

Figure 18:
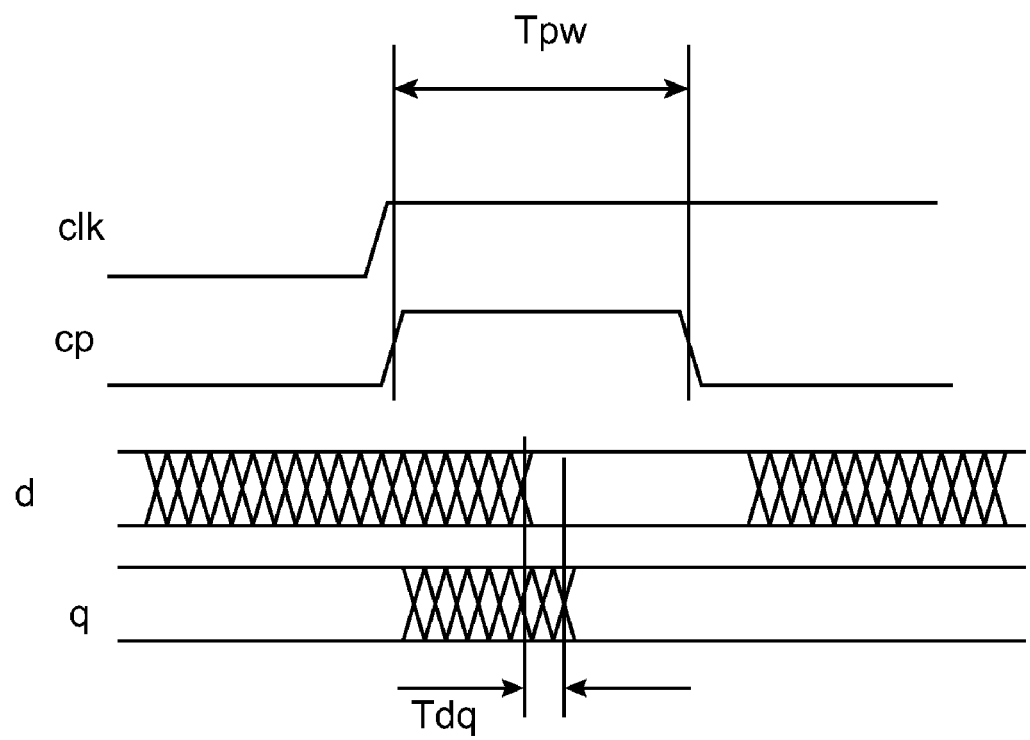
FIGS. 18, 19, and 20 are timing diagrams showing how configurable time borrowing flip-flops of the type shown in FIG. 16 operate in accordance with an embodiment of the present invention.
Figure 19:
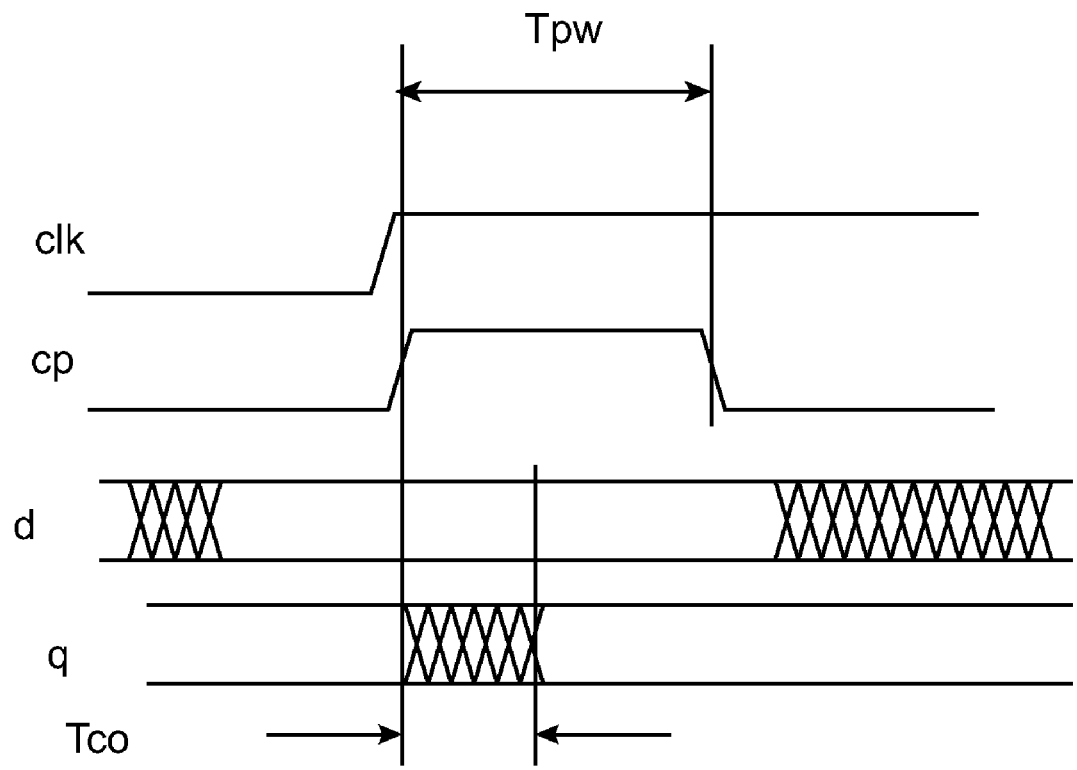
Figure 20:
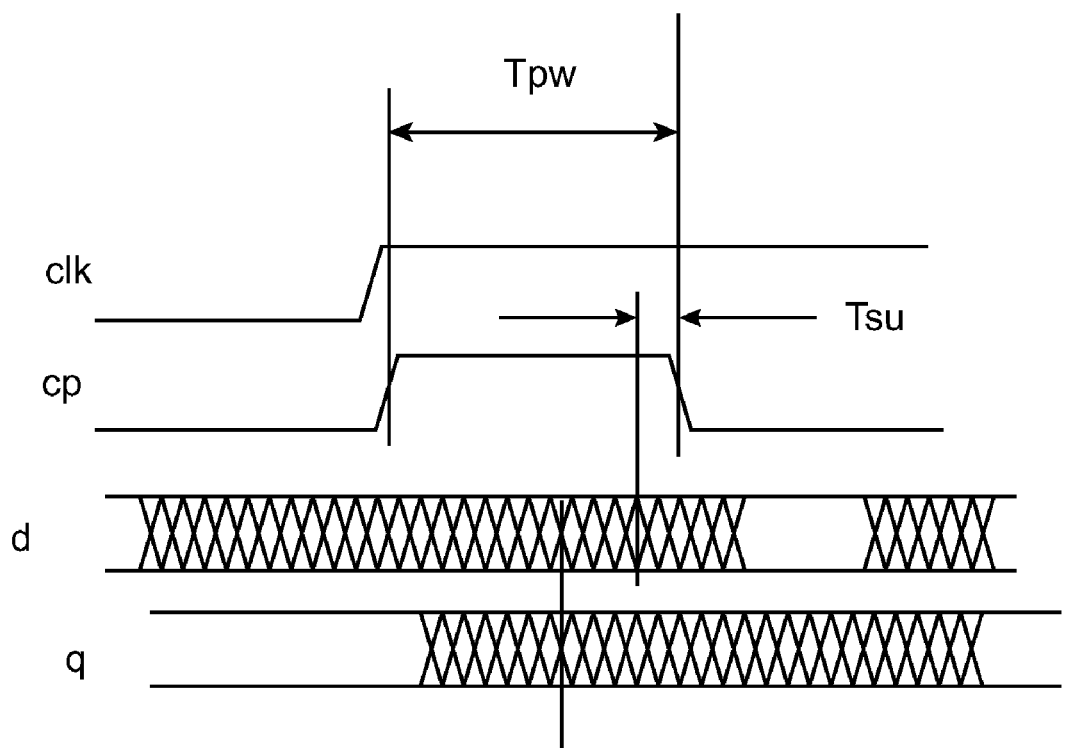

Timing diagrams illustrating the functionality of pulse-latched-based configurable time borrowing flip-flop 86 of FIG. 16 are shown in FIGS. 18, 19, and 20. A graph in which Tcq for the pulse-latch-based configurable time borrowing flip-flop 86 is plotted as a function of Td is shown in FIG. 21.

Figure 21:
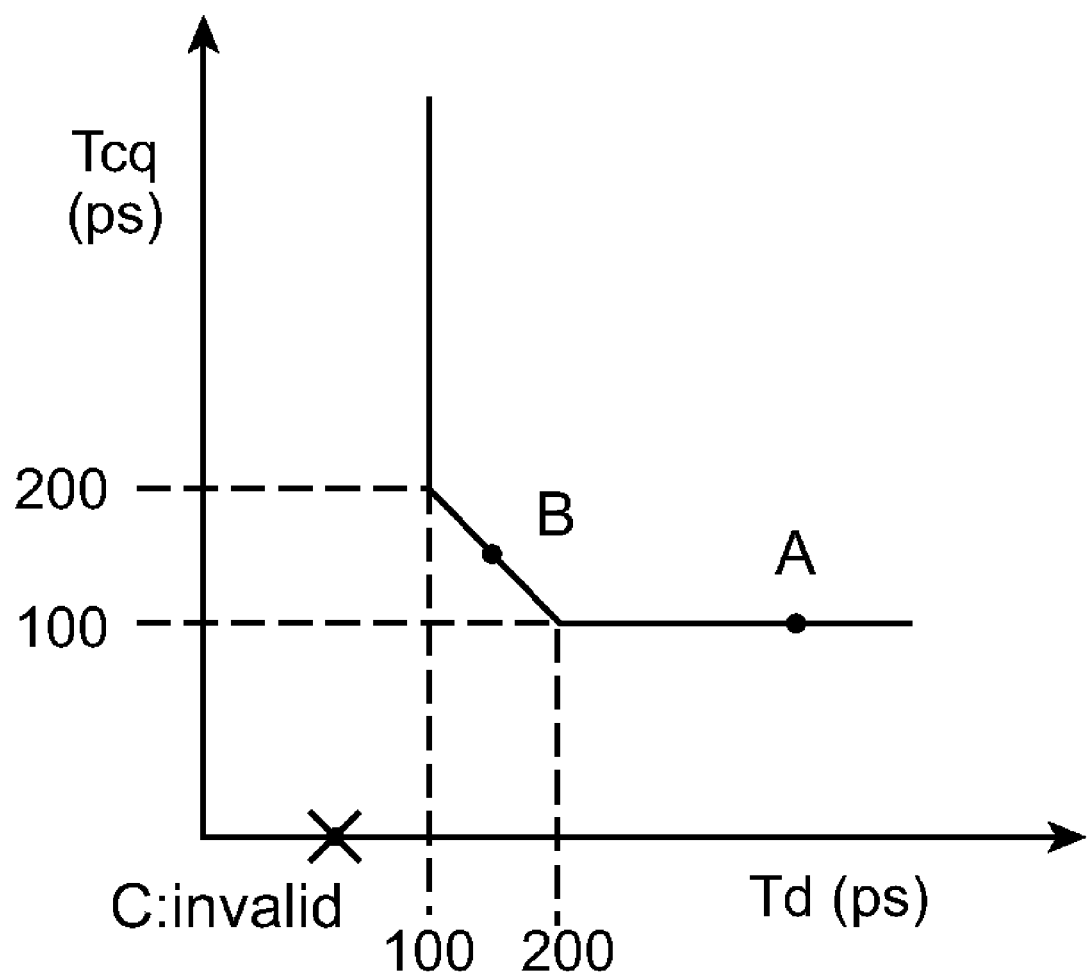
FIG. 21 is a graph of showing the relationship between timing variables for a configurable time borrowing flip-flop of the type shown in FIG. 16 when operated as shown in FIGS. 18, 19, and 20 in accordance with an embodiment of the present invention.

FIG. 18 corresponds to a pulse-latch-based configurable time borrowing flip-flop 86 of the type shown in FIG. 16 during operation at operating point B of FIG. 21. As shown in FIG. 18, data D is arriving at a point in time during the pulse CP, so latch 128 is enabled and output data Q changes Tdq later.

FIG. 19 corresponds to a pulse-latch-based configurable time borrowing flip-flop 86 of the type shown in FIG. 16 during operation at operating point A of FIG. 21. As shown in FIG. 19, data D is arriving well in advance of Tsu before the clock edge, so the timing of the flip-flop is controlled by Tco from the pulse.

FIG. 20 corresponds to a pulse-latch-based configurable time borrowing flip-flop 86 of the type shown in FIG. 16 at operating point C of FIG. 21 (which is invalid). As shown in FIG. 20, data D is arriving at a time later than the Tsu with respect to the falling edge of clock pulse CP. As a result, latch 128 (and therefore flip-flop 86) is not able to capture valid data.

Figure 22:
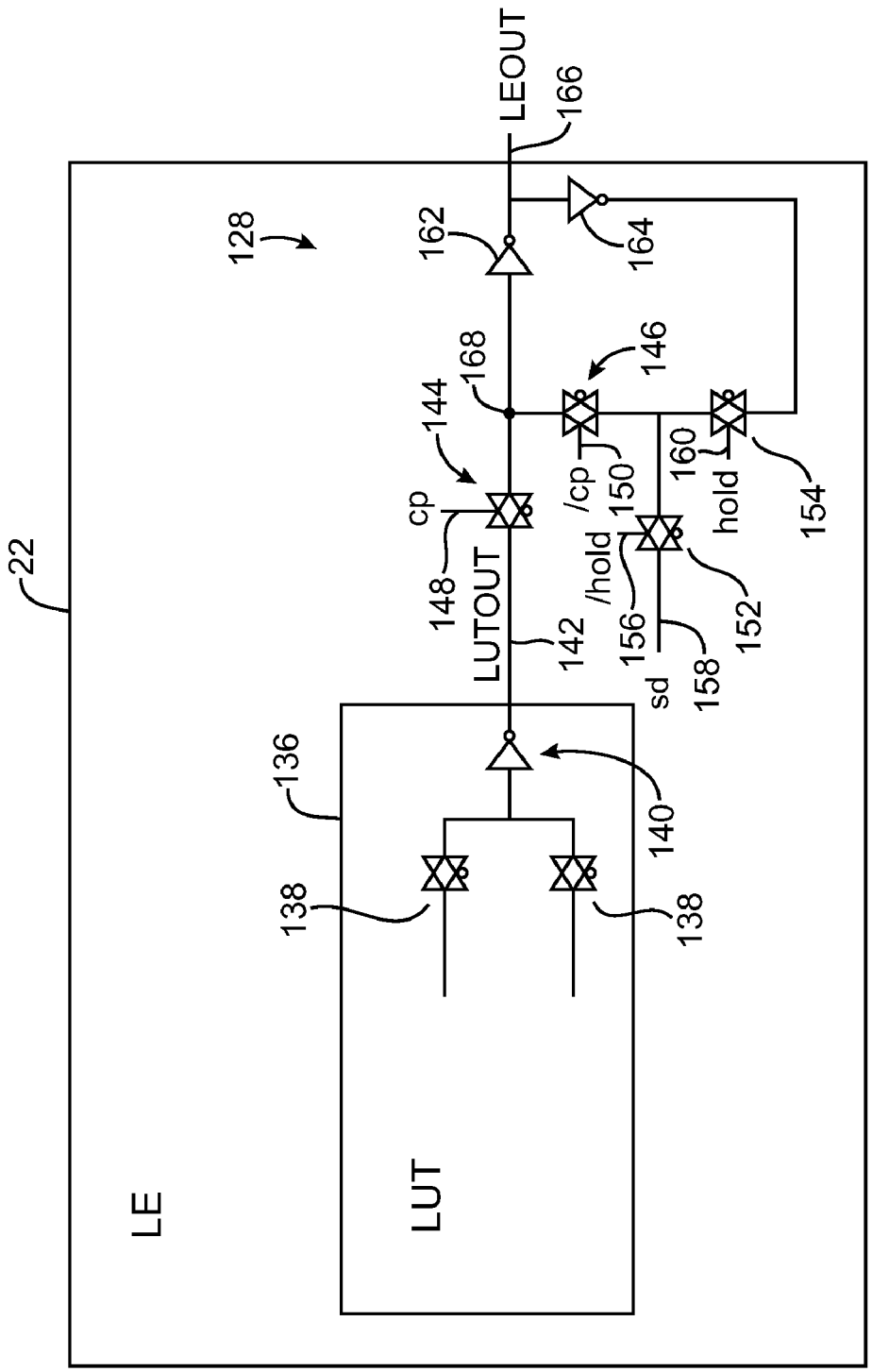
FIG. 22 is a diagram of a configurable time borrowing flip-flop based on a pulsed latch in a logic element on a programmable circuit such as a programmable logic device integrated circuit in accordance with an embodiment of the present invention.

It may be advantageous to use configurable time borrowing flip-flops 86 in logic elements 22 (FIG. 1). An illustrative embodiment of a pulse-latch-based configurable time borrowing flip-flop 86 that has been implemented in a logic element 22 is shown in FIG. 22. Illustrative logic element 22 of FIG. 22 has a look-up table 136. Look-up table 136 may be (as an example) a four-input look-up table. Look-up table 136 is an example of programmable logic that may be configured to perform a desired logic function on a number of input signals. If desired, other programmable logic (e.g., programmable logic gates in a non-look-up-table configuration) may be used to implement a configurable logic function. In general, any suitable configurable logic function circuitry may be used in logic elements 22. The use of a look-up table to form configurable logic function circuitry for a logic element is merely illustrative.

Complementary metal-oxide-semiconductor (CMOS) pass gates 138 and output buffer 140 make up the output stage of look-up table 136. The output signal LUTOUT from the look-up table 136 is provided on output line 142. CMOS pass gates 144 and 152 are used in loading a latch-based storage element (latch 128 of flip-flop 86) formed from CMOS pass gates 146 and 154 and inverters 162 and 164. The output data LEOUT from the logic element 22 is provided on output line 166.

Signal SD is provided on line 158 from logic circuitry within logic element 22. During operation, pulsed clock signal CP from configurable pulse generation circuit (and an inverted version of CP called /CP that is generated using an inverter connected to line 150) are applied to pass gates 144 and 146 at control inputs 148 and 150, respectively. Only the active high version of the control signals are labeled in FIG. 22 to avoid clutter in the diagrams. The CMOS pass gates of FIG. 22 also receive corresponding active low signals. CMOS pass transistors 152 and 154 are controlled by control signal HOLD and its inverse /HOLD, which are applied to control terminals 160 and 156, respectively. Inverter 164 taps the LEOUT signal and feeds it back to node 168 when pass gates 146 and 154 are enabled.

The circuitry of FIG. 22 can operate in three modes.

In a first mode, the pulse CP from configurable pulse generation circuitry 87 (FIG. 16) is high. When CP is high, pass gate 144 is enabled and pass gate 146 is disabled. This allows the data signal LUTOUT to be transferred to LEOUT and loads the latch element formed from cross-coupled inverters 162 and 164. In the case that the logic element is being used in combinational mode, CP will be high continuously.

In a second mode, signal CP is low, signal /CP is high, signal HOLD is high, and signal /HOLD is low. In this state, the latch that is formed from inverters 162 and 164 and pass gates 150 and 154 is in latching mode and retains its current state.

In a third mode, signal HOLD is low and signal /HOLD is high. This enables pass gate 152 and allows the latch to be loaded with data signal SD. The data signal SD may be used to force the latch to a desired state such as "loading another data source" or "setting the latch to 0". The CP and hold signals enable loading of the latch from SD by setting CP low and hold low for any combination of control and clock signals for which it is desired to load the state of the latch from an alternate data source.

The arrangement of FIG. 22 is merely illustrative. Other suitable circuitry may be used to combine a pulse-based latch element with logic element circuitry if desired. For example, other auxiliary signals such as clock enable, synchronous load, synchronous clear, asynchronous clear, and asynchronous load may be incorporated into the flip-flop 86. The arrangement of FIG. 22 is provided as an example.

Figure 23:
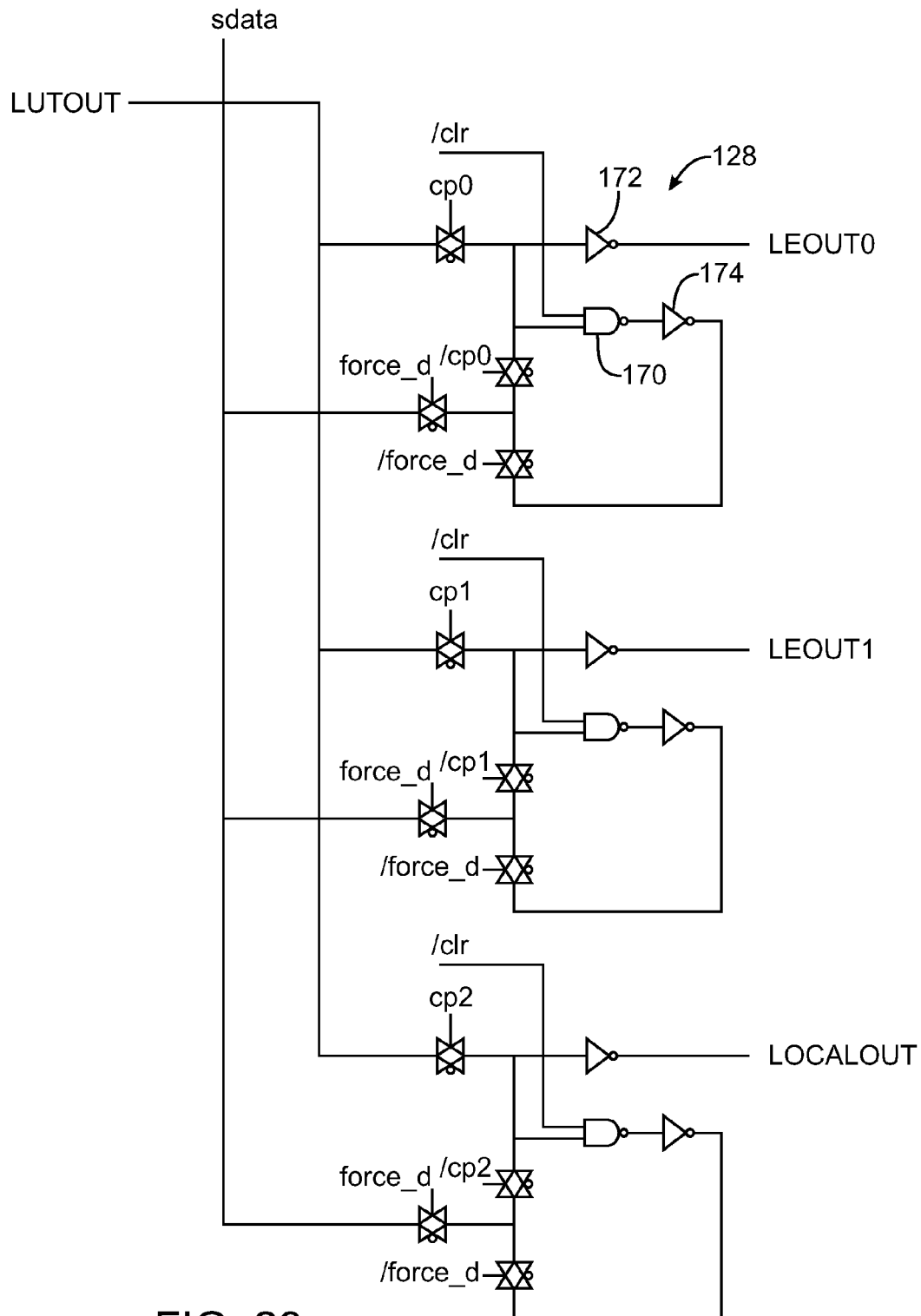
FIGS. 23 and 24 are diagrams of configurable time borrowing flip-flop circuits in which multiple logic element outputs are associated with a given look-up table in accordance with an embodiment of the present invention.

In the embodiment of FIG. 22, level sensitive latch 128 is formed using an inverter 162 that drives logic element output LEOUT. If desired, other inverting logic may be used to provide the inversion function of inverter 162. For example, inverting logic may be used that is separate from the output logic driving LEOUT. This may improve switching speed. Moreover, inverting logic may be used that provides enhanced functionality. An example is shown in FIG. 23. In the example of FIG. 23, the inversion function of inverter 162 of FIG. 22 is provided using NAND gate 170. Inverter 172 drives LEOUT0 and may experience delays due to circuit loading. Because NAND gate 170 is separate from inverter 172 and drives only dedicated inverter 174, switching speed is improved. In addition, the /clr line that serves as one of the inputs to NAND gate 170 may be used to provide clear functionality for latch 128.

Figure 24:
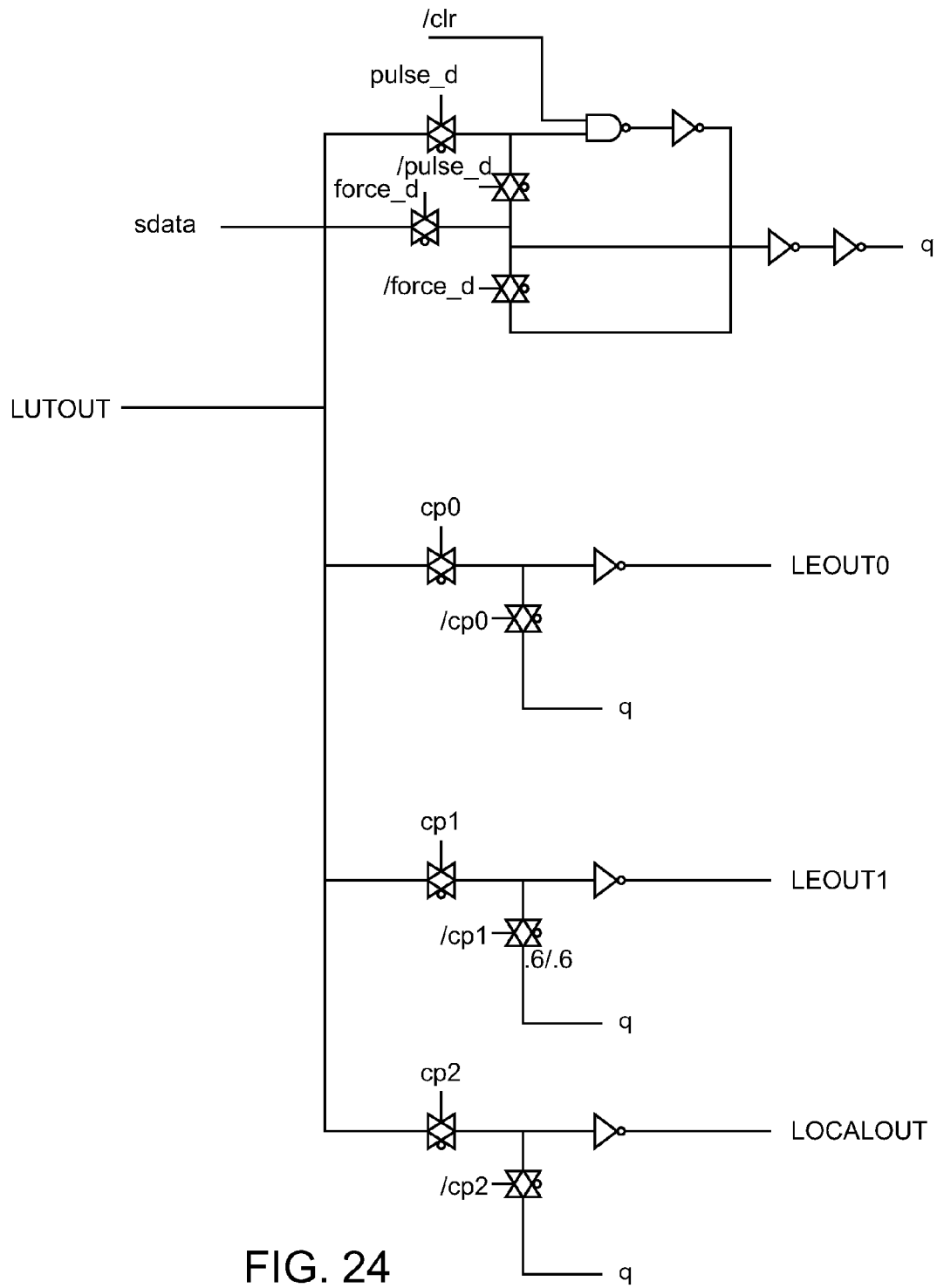

As shown in FIG. 23, there may be multiple outputs LEOUT0, LEOUT1, LOCALOUT, etc. that are associated with a given look-up table. A latch may be constructed for each such output as shown in FIG. 23 or a single latch may be shared among multiple logic element outputs as shown in FIG. 24.

The foregoing is merely illustrative of the principles of this invention and various modifications can be made by those skilled in the art without departing from the scope and spirit of the invention.

What is claimed is:

1. A configurable flip-flop, comprising:
   a flip-flop data input;
   a flip-flop data output;
   first and second latches coupled between the flip-flop data input and the flip-flop data output, wherein the second latch is operable to receive a clock signal that contains a clock edge; and
   a configurable delay circuit operable to receive the clock signal and operable to adjust an amount of time between the clock edge and when valid data is provided at the flip-flop data output by providing an adjustable delayed version of the clock signal to the first latch.

2. The configurable flip-flop defined in claim 1 further comprising a flip-flop clock input operable to receive the clock signal, wherein the configurable delay circuit is operable to receive the clock signal from the flip-flop clock input, and wherein the second latch is operable to receive the clock signal from the flip-flop clock input.

3. The configurable flip-flop defined in claim 1 wherein the flip-flop data input is coupled to the first latch the flip-flop data output is coupled to the second latch, the configurable flip-flop further comprising a flip-flop clock input operable to receive the clock signal.

4. The configurable flip-flop defined in claim 3 wherein the first latch comprises:
   a data input coupled to the flip-flop data input;
   a data output; and
   a clock input coupled to the configurable delay circuit and operable to receive the adjustable delayed version of the clock signal from the configurable delay circuit.

5. The configurable flip-flop defined in claim 4 wherein the second latch comprises:
   a data input coupled to the data output of the first latch;
   a data output coupled to the flip-flop data output; and
   a clock input coupled to the flip-flop clock input and operable to receive the clock signal from the flip-flop clock input.

6. The configurable flip-flop defined in claim 1 wherein the configurable delay circuit comprises a programmable multiplexer having an output that is coupled to the first latch.

7. The configurable flip-flop defined in claim 6 wherein the configurable delay circuit comprises programmable memory elements operable to store data and operable to produce control signals for the programmable multiplexer corresponding to the data.

8. The configurable flip-flop defined in claim 1 wherein the configurable delay circuit comprises programmable memory elements operable to store configuration data and operable to produce output signals corresponding to the configuration data to adjust the adjustable delayed version of the clock signal.

9. An integrated circuit, comprising:
   first and second configurable flip-flops, each of the first and second configurable flip-flops comprising:
     a flip-flop clock input operable to receive a clock signal for that configurable flip-flop;
     first and second latches; and
     a configurable delay circuit operable to receive the clock signal of that configurable flip-flop, operable to generate an adjustable delayed version of the clock signal of that configurable flip-flop by delaying the clock signal of that configurable flip-flop by an adjustable amount of time, and operable to provide the adjustable delayed version of the clock signal of that configurable flip-flop to the first latch of that configurable flip-flop, wherein the adjustable amounts of time of the clock signals associated with the first and the second configurable flip-flops are different from one another.

10. The integrated circuit defined in claim 9 further comprising at least one logic element operable to perform a logic function having a processing delay and wherein the adjustable amounts of time of the clock signals associated with the first configurable flip-flop and the second configurable flip-flop are selected based at least partly on the processing delay.

11. The integrated circuit defined in claim 10 wherein each of the configurable flip-flops comprises a flip-flop data input and a flip-flop data output and wherein the at least one logic element has an input coupled to the flip-flop data output of the first configurable flip-flop and has an output coupled to the flip-flop data input of the second configurable flip-flop.

12. The integrated circuit defined in claim 11 wherein the configurable delay circuits of the first and second configurable flip-flops comprise programmable memory elements and wherein the programmable memory elements are operable to store configuration data and are operable to produce output signals corresponding to the configuration data to adjust the first and second configurable flip-flops.

13. The integrated circuit defined in claim 11 wherein the configurable delay circuit of the first configurable flip-flop comprises a first plurality of programmable memory elements operable to produce first output signals to adjust the adjustable amount of time of the clock signal associated with the first configurable flip-flop, wherein the configurable delay circuit of the second configurable flip-flop comprises a second plurality of programmable memory elements operable to produce second output signals to adjust the adjustable amount of time of the clock signal associated with the second configurable flip-flop, and wherein the first output signals are different from the second output signals.

14. The integrated circuit defined in claim 11 wherein the first latch of each of the configurable flip-flops comprises:
    a data input coupled to the flip-flop data input of that configurable flip-flop;
    a data output; and
    a clock input coupled to the configurable delay circuit of that configurable flip-flop and operable to receive the adjustable delayed version of the clock signal of that configurable flip-flop from the configurable delay circuit of that configurable flip-flop, wherein the second latch of each of the configurable flip-flops comprises:
    a data input coupled to the data output of the first latch of that configurable flip-flop;
    a data output coupled to the flip-flop data output of that configurable flip-flop; and
    a clock input coupled to the flip-flop clock input of that configurable flip-flop and operable to receive the clock signal of that configurable flip-flop.

15. An integrated circuit, comprising:
    a first configurable flip-flop comprising:
      a first latch; and
      a first configurable pulse generation circuit operable to receive a clock signal and operable to provide a corresponding first clock pulse with a first configurable width to the first latch; and
    a second configurable flip-flop comprising:
      a second latch; and
      a second configurable pulse generation circuit operable to receive the clock signal and operable to provide a corresponding second clock pulse with a second configurable width to the second latch, wherein the first and second configurable widths are different.

16. The configurable flip-flop defined in claim 15 further comprising, a flip-flop clock input operable to receive the clock signal, a flip-flop data input, and a flip-flop data output, wherein the first configurable pulse generation circuit is operable to receive the clock signal from the flip-flop clock input.

17. The configurable flip-flop defined in claim 16 wherein the first latch comprises a data input coupled to the flip-flop data input, a data output coupled to the flip-flop data output, and a clock input operable to receive the first clock pulse with the first configurable width.

18. The configurable flip-flop defined in claim 17 wherein the first configurable pulse generation circuit comprises a logic circuit having first and second inputs and having an output, wherein the first input is operable to receive the clock signal from the flip-flop clock input.

19. The configurable flip-flop defined in claim 18 wherein the first configurable pulse generation circuit comprises a configurable delay circuit operable to receive the clock signal from the flip-flop clock input and operable to provide a corresponding delayed version of the clock signal to the second input of the logic circuit and wherein the output of the logic circuit is coupled to the clock input of the first latch.

20. A configurable flip-flop comprising:
a latch;
a configurable pulse generation circuit operable to receive a clock signal and operable to provide a corresponding clock pulse with a configurable width to the latch; and
a flip-flop clock input operable to receive the clock signal, a flip-flop data input, and a flip-flop data output, wherein the configurable clock pulse generation circuit is operable to receive the clock signal from the flip-flop clock input, wherein the latch comprises a data input coupled to the flip-flop data input, a data output coupled to the flip-flop data output, and a clock input operable to receive the clock pulse with the configurable width, wherein the configurable pulse generation circuit comprises a logic circuit having first and second inputs and having an output, wherein the first input is operable to receive the clock signal from the flip-flop clock input, wherein the configurable pulse generation circuit comprises a configurable delay circuit operable to receive the clock signal from the flip-flop clock input and operable to provide a corresponding delayed version of the clock signal to the second input of the logic circuit and wherein the output of the logic circuit is coupled to the clock input of the latch, wherein the configurable delay circuit comprises a programmable multiplexer operable to receive control signals from programmable memory elements loaded with data.

21. A configurable flip-flop operable to receive a clock signal including a clock edge, comprising:
a flip-flop data input;
a flip-flop data output operable to produce data, wherein there is a first amount of time between the clock edge and when the data becomes valid;
first and second latches coupled between the flip-flop data input and the flip-flop data output; and
a configurable delay circuit operable to receive the clock signal and operable to change the first amount of time by providing an adjustable delayed version of the clock signal to the first latch in which the clock edge is delayed by a second amount of time, wherein the second latch is operable to receive the clock signal.

22. The configurable flip-flop defined in claim 21 wherein the first amount of time represents a clock-to-output time and wherein the configurable delay circuit is operable to increase the clock-to-output time by increasing the second amount of time.

23. The configurable flip-flop defined in claim 21 wherein valid data on the flip-flop data input is needed for a third amount of time before the clock edge, wherein the third amount of time represents a setup time and wherein the configurable delay circuit is operable to decrease the setup time by increasing the second amount of time.

* * * * *